(12) United States Patent
Machida

(10) Patent No.: US 6,915,514 B1
(45) Date of Patent: Jul. 5, 2005

(54) INFORMATION PROCESSING APPARATUS, INFORMATION PROCESSING SYSTEM, CONTROL METHOD OF INFORMATION PROCESSING APPARATUS, CONTROL METHOD OF INFORMATION PROCESSING SYSTEM, AND STORAGE MEDIUM HAVING PROGRAMS CAPABLE OF BEING READ AND STORED BY COMPUTER

(75) Inventor: Haruo Machida, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/544,265

(22) Filed: Apr. 6, 2000

(30) Foreign Application Priority Data

| Apr. 9, 1999 | (JP) | ............................................ 11-102068 |
| Apr. 9, 1999 | (JP) | ............................................ 11-102075 |
| Mar. 21, 2000 | (JP) | ........................................ 2000-078191 |

(51) Int. Cl.[7] .................................................. G06F 9/44
(52) U.S. Cl. ....................................... 717/174; 717/168
(58) Field of Search ................................. 717/168–178; 709/200, 203

(56) References Cited

U.S. PATENT DOCUMENTS

| 5,586,254 A | * | 12/1996 | Kondo et al. .................. 714/25 |
| 5,680,618 A | * | 10/1997 | Freund ........................... 707/7 |
| 5,796,951 A | * | 8/1998 | Hamner et al. ............. 709/223 |
| 5,809,265 A | * | 9/1998 | Blair et al. .................. 345/764 |
| 5,819,042 A | * | 10/1998 | Hansen ........................ 709/222 |
| 6,023,585 A | * | 2/2000 | Perlman et al. ............. 717/178 |
| 6,151,708 A | * | 11/2000 | Pedrizetti et al. ........... 717/173 |
| 6,230,194 B1 | * | 5/2001 | Frailong et al. ............ 709/220 |
| 6,271,454 B1 | * | 8/2001 | Tamura ........................ 84/603 |
| 6,301,012 B1 | * | 10/2001 | White et al. ............... 358/1.15 |
| 6,353,926 B1 | * | 3/2002 | Parthesarathy et al. ..... 717/170 |
| 6,513,159 B1 | * | 1/2003 | Dodson ....................... 717/178 |
| 6,714,974 B1 |   | 3/2004 | Machida ..................... 709/223 |

* cited by examiner

Primary Examiner—Wei Y. Zhen
(74) Attorney, Agent, or Firm—Fitzpatrick, Cella, Harper & Scinto

(57) ABSTRACT

An information processing apparatus simply and quickly updates device drivers for devices shared on the network. If version information of a driver for a network device registered in a management server is newer than that of a driver installed in a PC, a CPU obtains driver setup information from the management server, and updates the driver based on the driver setup information.

64 Claims, 19 Drawing Sheets

| | | | |
|---|---|---|---|
| 61 | | MACHINE | 61a |
| | | USER | 61b |
| | | DATE | 61c |
| | | NO. OF DATA | 61d |
| | | COMMENT | 61e |
| 62 | 1 | NAME | 62a |
| | | ATTRIBUTE | 62b |
| | | STATUS | 62c |
| | | DISPLAY POSITION | 62d |
| | | COMMENT | 62e |
| | 2 | NAME | 63a |
| | | ATTRIBUTE | 63b |
| | | STATUS | 63c |
| | | DISPLAY POSITION | 63d |
| | | COMMENT | 63e |
| | ⋮ | | |
| | N | NAME | 64a |
| | | ATTRIBUTE | 64b |
| | | STATUS | 64c |
| | | DISPLAY POSITION | 64d |
| | | COMMENT | 64e |

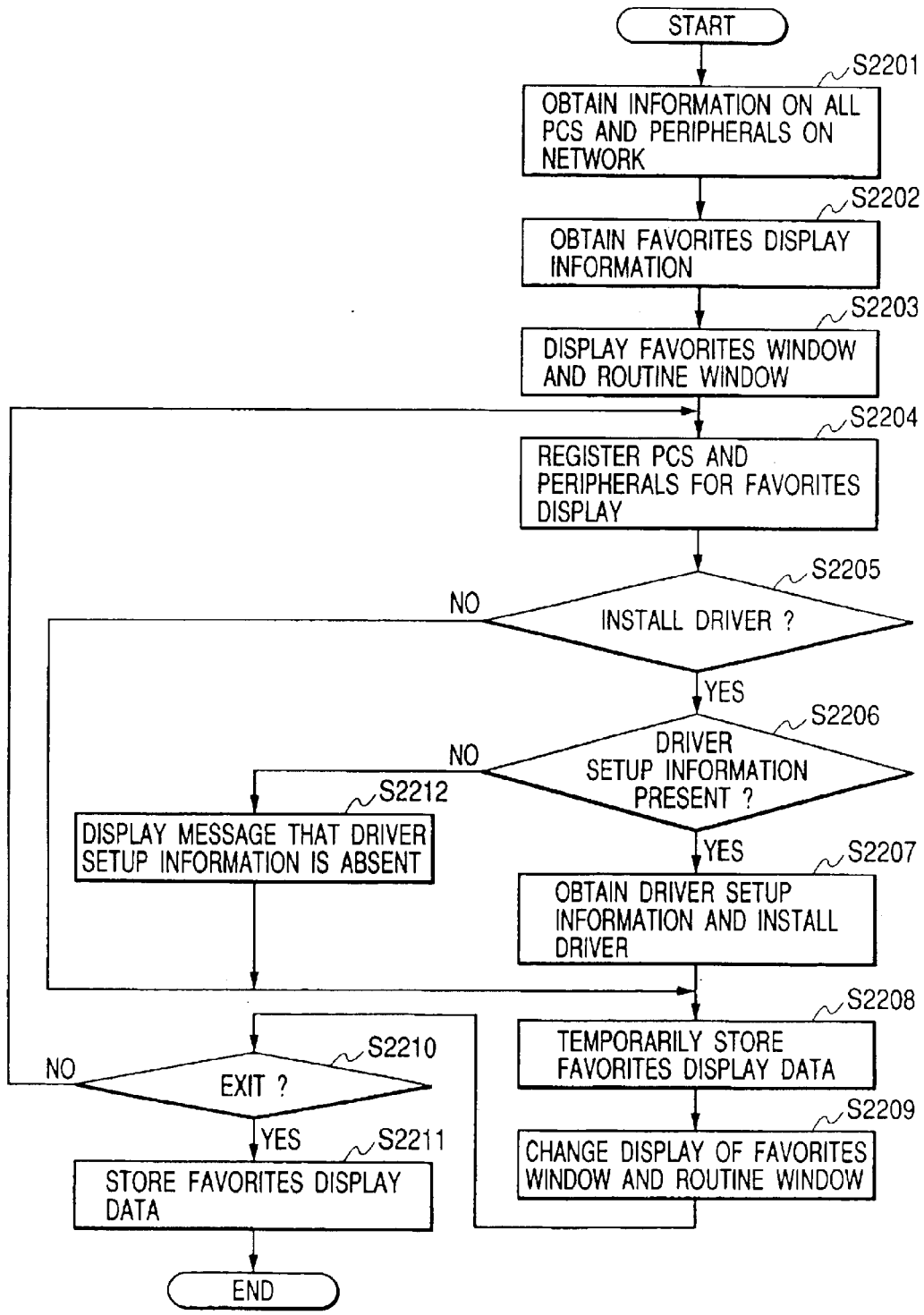

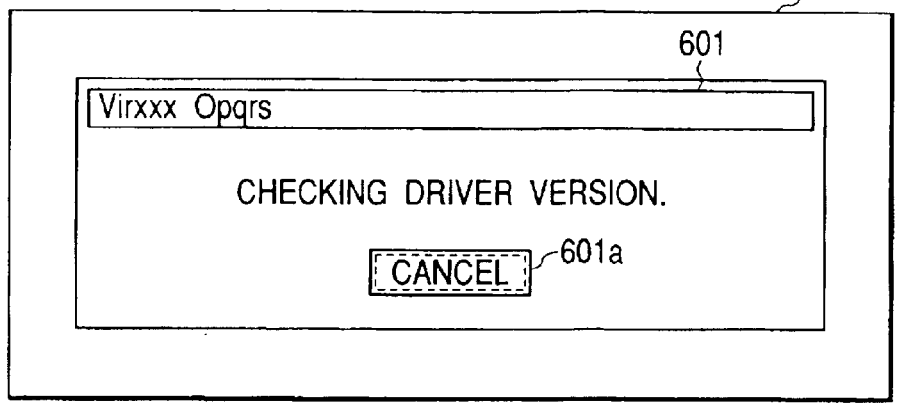
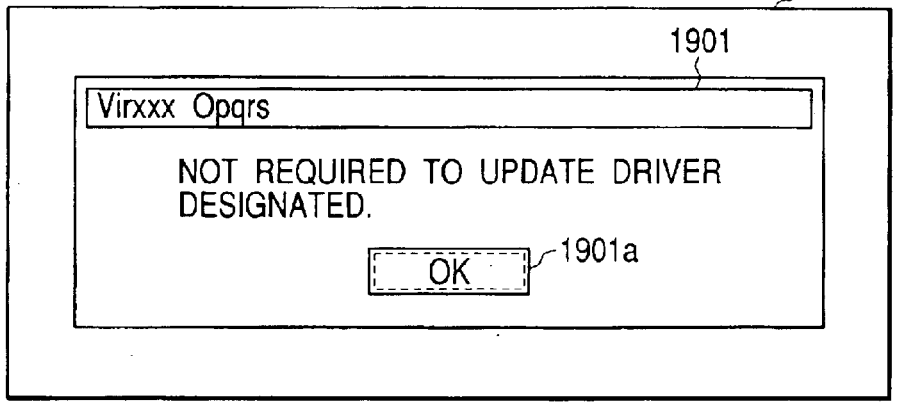
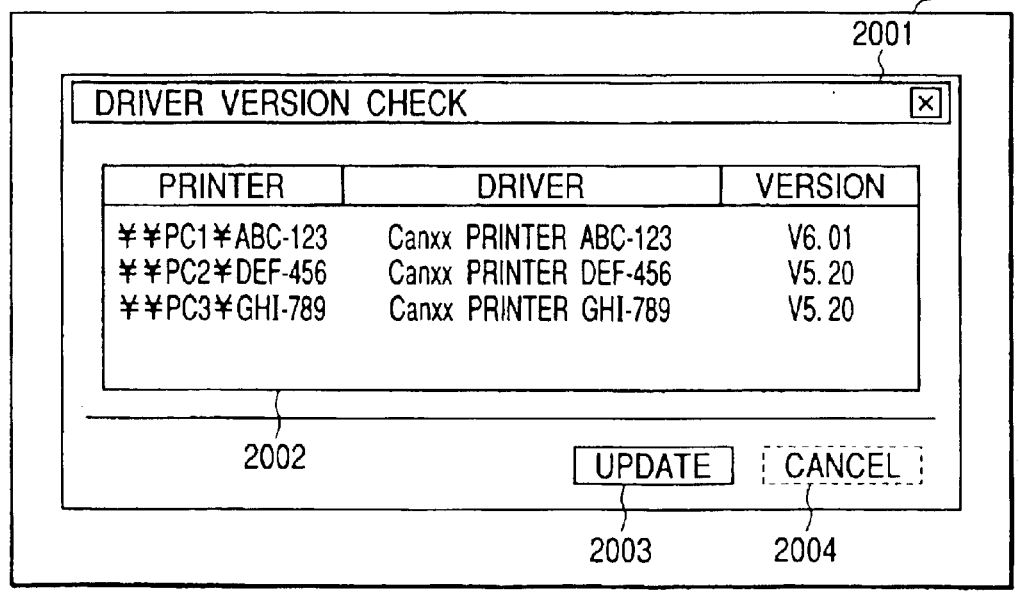

FIG. 26

MEMORY MAP OF MEMORY
MEDIUM (FD/CD-ROM)

| DIRECTORY |
|---|
| 1ST DATA PROCESSING PROGRAM PROGRAM CODES FOR FLOWCHART OF FIG. 10 |
| 2ND DATA PROCESSING PROGRAM PROGRAM CODES FOR FLOWCHART OF FIG. 12 |
| 3RD DATA PROCESSING PROGRAM PROGRAM CODES FOR FLOWCHART OF FIG. 17 |
| 4TH DATA PROCESSING PROGRAM PROGRAM CODES FOR FLOWCHART OF FIG. 21 |
| 5TH DATA PROCESSING PROGRAM PROGRAM CODES FOR FLOWCHART OF FIG. 23 |
| 6TH DATA PROCESSING PROGRAM PROGRAM CODES FOR FLOWCHART OF FIG. 24 |
| ⋮ |

INFORMATION PROCESSING APPARATUS, INFORMATION PROCESSING SYSTEM, CONTROL METHOD OF INFORMATION PROCESSING APPARATUS, CONTROL METHOD OF INFORMATION PROCESSING SYSTEM, AND STORAGE MEDIUM HAVING PROGRAMS CAPABLE OF BEING READ AND STORED BY COMPUTER

BACKGROUND OF THE INVENTION

1. Field of the Invention

The present invention relates to an information processing apparatus capable of being communicated with external apparatuses through a fixed communication medium, an information processing method and a storage medium having programs capable of being read by a computer stored, and particularly relates to a method for installing a driver for controlling an external apparatus.

2. Related Background Art

Recently, under the environment of network system, peripheral devices such as a PC (Personal Computer), a printer, an image read device (scanner), and a digital camera are popularized; a network such as a LAN is popularized; and the need increases in which a printer, a modem and an image read device are owned jointly on the network by computers connected to the network.

The devices such as a printer, a scanner and so on are owned jointly on the network; as described above, to thereby attain the environment in which the computers connected to the network can use all devices connected to the network.

Since connecting information of these peripheral devices is displayed every kind of the peripheral devices (for example, a printer is displayed every printer, and a scanner is displayed every scanner), the connecting circumstances have to be checked every time, which makes operation hard to understand, or where very many peripheral devices are connected onto the network, unnecessary peripheral devices are also displayed, resulting in poor operating properties.

However, it is necessary for using these devices to install a driver on a computer connected on the network. The installing procedures are different every device, and the kinds of drivers have to be selected, thus making operation hard to understand. There poses a further problem that the installing operation is very cumbersome.

Further, with respect to all devices connected to the network, it is necessary to always watch updating information of drivers, and when the driver is updated, the driver has to be installed again by the individual computer connected to the network, thus posing a problem of poor work efficiency.

SUMMARY OF THE INVENTION

The present invention has been achieved in order to solve the aforementioned problems. A first object of the present invention is to provide an information processing method for indicating installation in a user interface having the system circumstances of peripheral devices owned jointly on a network, automatically installing drivers of the peripheral devices to thereby exceptionally relieve a driver setting operating burden caused on the user required at the time of installation, thus making the driver installing operation effective.

A second object of the present invention is to provide an information processing method for performing installation of a plurality of drivers corresponding to a plurality of peripheral devices by a single operation indication to thereby eliminate a burden for performing installing indications by times of the peripheral devices desired for installing processing, thus enabling the driver installing operation effective.

A third object of the present invention is to provide an information processing method for displaying, at the time of driver installation, the whole system circumstances and the system circumstances of user networks of peripheral devices suitably selected from the whole system circumstances, and executing necessary driver installing processing in accordance with the indication of registration of the peripheral devices relative to the network to thereby exceptionally eliminate a driver setting operating burden on a user required at the time of driver installation in prior art, thus making the driver installing operation effective.

A fourth object of the present invention is to provide an information processing method for updating, where peripheral devices to update drivers incorporated in an information processing apparatus are designated, the drivers of the information processing apparatus on the basis of a version of the drivers of the peripheral devices incorporated in the information processing apparatus and a version of drivers of peripheral devices owned jointly on a network to thereby enable updating of the drivers of the devices owned jointly on the network more simply and in a shorter period of time, and enabling exceptional enhancement of updating work efficiency of a user.

A fifth object of the present invention is to provide an information processing method for recognizing, where an updating notice of a driver is received from an external device, version information of drivers of peripheral devices incorporated in an information processing apparatus to update the drivers of the peripheral devices, thus enabling incorporation of the latest drivers into the information processing apparatus always.

The first invention according to the present invention provides an information processing apparatus (PC 111) capable of communicating with an external device (such as a control server 103 shown in FIG. 1) through a network (LAN 100 shown in FIG. 1), comprising: acquiring means (CPU 2 shown in FIG. 2 for executing processing based on a flow chart shown in FIG. 10) for acquiring device information of peripheral devices owned jointly on the network from an external device; system display control means (device display window 300 shown in FIG. 3) for displaying the system circumstances of the peripheral devices owned jointly on the network on a user interface with an icon on the basis of said device information acquired from said external device by said acquiring means; indication means (501 in FIG. 4) for indicating, in the user interface in which the system circumstances are displayed by said system display control means, installation of a driver corresponding to the peripheral device owned jointly on the network; and installation control means (CPU 2 shown in FIG. 2 for executing processing based on a flow chart shown in FIG. 10) for acquiring the setting information of the driver for which installation is indicated by said indication means to execute automatic installation processing of the driver.

The second invention of the present invention depending on the first invention provides an information processing apparatus wherein in the user interface on which the system circumstances are displayed by said system display control means, the installation of the driver corresponding to the plurality of peripheral devices owned jointly on the network can be indicated by a single operating indication.

The third invention according to the present invention provides an information processing apparatus capable of communicating with an external device through a network, comprising: device information acquiring means for acquiring device information of peripheral devices owned jointly on the network from an external device; system display control means for displaying the whole system circumstances of peripheral devices owned jointly on the network, and the system circumstances of a user network of peripheral devices selected suitably from said whole system circumstances on a user interface with icons capable of being recognized on a display, on the basis of said device information acquired from said external device by said device information acquiring means; indication means for indicating registration of the peripheral devices on said user network; and install control means for executing, where registration of peripheral devices is newly indicated relative to said user network by said indication means, install processing of drivers corresponding to said peripheral devices.

The fourth invention according to the present invention provides an information processing apparatus capable of communicating with an external device through a network, comprising: recognition means for recognizing version information of drivers of peripheral devices incorporated in said information processing apparatus; acquiring means for acquiring version information of drivers of peripheral devices owned jointly on the network from said external device; indication means for indicating peripheral devices to update drivers incorporated in said information processing apparatus; and updating means for updating the drivers of the peripheral devices designated by said designation means on the basis of the version information of the drivers acquired by said acquiring means and the version information of the drivers recognized by said recognition means.

The fifth invention according to the present invention provides an information processing apparatus capable of communicating with an external device through a network, comprising: receiving means for receiving updating notice including version information of drivers of peripheral devices from the external device recognition means for recognizing version information of drivers of peripheral devices incorporated in said information processing apparatus; and updating means for updating the drivers indicated by said indication means on the basis of the version information of the drivers notified in updating by said receiving means and the version information of the drivers incorporated.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 17 is a flowchart showing one example of a third data processing procedure in the data processing apparatus according to the present invention.

FIG. 18 is a view for explaining one example of a message window displayed on CRT shown in FIG. 2.

FIG. 19 is a view for explaining one example of a message window displayed on CRT shown in FIG. 2.

FIG. 20 is a view for explaining one example of a check result window displayed on CRT shown in FIG. 2.

FIG. 26 is a view for explaining a memory map of a storage medium for storing various data processing programs that can be read by the information processing apparatus according to the present invention.

DESCRIPTION OF THE PREFERRED EMBODIMENTS

Figure 1:
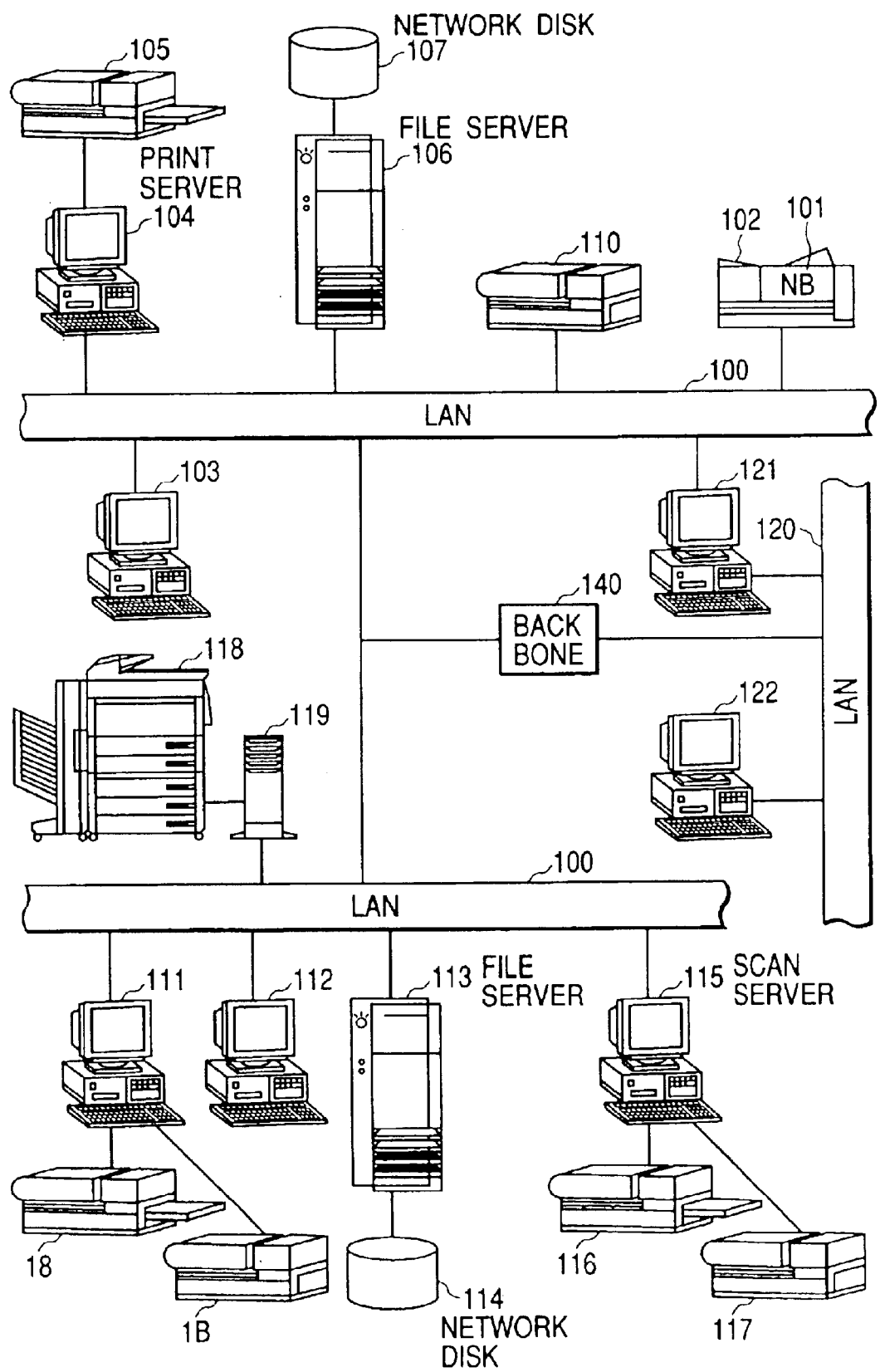
FIG. 1 is a view for explaining the system constitution of a network apparatus including a data processing apparatus according to the present invention.

FIG. 1 is a view for explaining one example of the information processing system showing the present embodiment, showing the network constitution where network apparatuses are connected to a network.

In FIG. 1, reference numeral 102 designates a printer, which has an open type architecture, and is connected to the network through a network board (NB) 101. NB 101 is connected to a local area network (LAN) through local area network interfaces such as an Ethernet interface 10 Base-2 having a coaxial connector and 10 Base-T having RJ-45.

A plurality of personal computers (PC) such as PC 103, 104, 111, 112 are connected to LAN 100, and these PC 103, 104, 111, 112 can be communicated with NB 101 under the control of a network operating system. Accordingly, one of the PCs, for example, PC 103 can be used as a network device controlling PC (control server). Further, a printer 105 may be locally connected as a local printer to PC 104. A printer 18 and an image reading device 1B are locally connected to PC 111.

Numerals 106 and 113 designate a PC having a function as a file server, and are connected to LAN 100 to control the access to files stored in network disks 107 and 114 having a large capacity (a 100-billion byte).

PC 104 also functions as a PC which functions as a printer server to control printing of a printer 105 connected to locally and a printer 102 located at a remote place. Numeral 115 designates PC which functions as a scanner server to control a scanner 117 connected to local and a scanner 110 located at a remote place. PC 115 which functions as a scanner server has a printer 116 connected to local.

The scanner 110 is connected to LAN 100 through a network board or the like, not shown. Numeral 118 designates a copier, which functions as a printer or a scanner under the control of an image processing unit 119.

In the network shown in FIG. 1, network software such as Novell and UNIX can be used in order to perform communication efficiently between various network members. For example, a NetWare (a registered trademark of Novell Ltd., hereinafter abbreviated) software of Novell Ltd. can be used. A detailed explanation in connection with this software package is described in an on-line documentation contained in the NetWare package.

PC 103 and PC 104 are respectively general PC which can perform formation of a data file, transmission of the formed data file to LAN 100, reception of a file from LAN 100, and display and/or processing of the file.

FIG. 1 shows a personal computer (PC) as one example of an information processing apparatus connected to a network, which however may be other computers suitable for executing the network software. For example, where UNIX software is used, a UNIX workstation may be connected to a network, and these work stations are used together with PC shown.

Normally, LAN 100 provide a service to a relatively local user group, for example, a user group on one floor or a plurality of floors within one building. On the other hand, when users are separately located such that they are located in different buildings or different areas, a wide area network (WAN) may be constructed. Basically, WAN is formed such that several LAN are connected by high speed digital lines such as a service synthetic digital network (ISDN) LAN is an assembly.

For example, as shown in FIG. 1, LAN 100 and LAN 120 are connected to a back bone 140 whereby WAN is formed. Machines connected to LAN 120 can access to the function of other machines connected to LAN through WAN connection. For example, PC 121, 122 connected to LAN 120 can be connected to various devices (peripheral devices) such as a PC, a server, a printer, a scanner, a copier, etc. connected to LAN 100 through WAN connection to receive and transfer various files and data.

Figure 2:
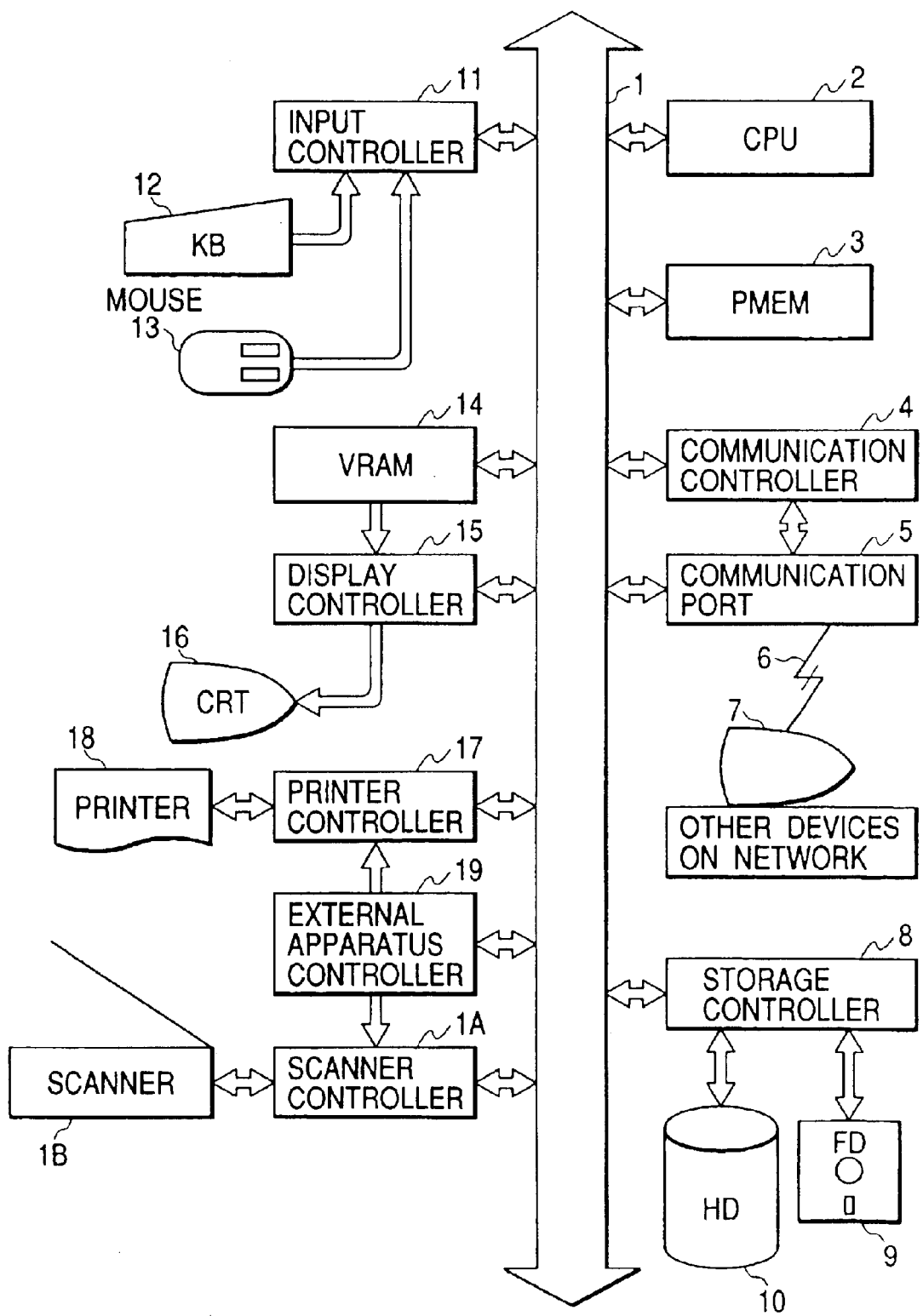
FIG. 2 is a block diagram for explaining the constitution of a data processing apparatus showing a first embodiment of the present invention.

FIG. 2 is a block diagram for explaining the client constitution showing the present embodiment, which is capable of directly communicating with fixed peripheral devices (including a printer, a scanner, a modem, a composite image processor, etc.) through LAN such as Ethernet, and is capable of communicating, under fixed protocol, with other data processing apparatuses to which are connected local peripheral devices. The block diagram of the data processing apparatus will be described with reference to FIG. 2. It is noted that in the present embodiment, the information processing apparatus corresponds to PC 111. The same parts as those of FIG. 1 are indicated by the same reference numerals.

In FIG. 2, numeral 1 designates a system bus, and constituent blocks described later are connected to the system bus. Numeral 2 designates a CPU (Central Processing Unit) which controls the constituent blocks connected to the system bus 1. Numeral 3 designates a program memory (PMEM) which suitably selects/reads programs for the present processing from a hard disk 10, which are executed by CPU 2.

Data input from the keyboard 12 are stored as code information in PMEM 3 which also serves as a text memory.

Numeral 4 designates a communication controller, which controls input/output data in a communication port 5. A signal output from the communication port 5 is transmitted to communication ports of other devices 7 (PC, servers, devices; etc. shown in FIG. 2) connected to networks (such as LAN, WAN, etc.). The transmit-receiving of various data with respect to various devices such as an image reading device are carried out through the communication controller 4. While in the present embodiment, a description is made of the case where PC is connected to the network such as LAN, it is to be noted needless to say that even the communication port 5a and the communication circuit 6 connected to the communication controller 4 are general public circuits (such as a telephone circuit, an internet circuit, etc.), the present invention is applied thereto.

Numeral 8 designates an external storage controller.

Numerals 9 and 10 designate a disk for data file, which store various data such as data file. Here, as one example, 9 is a floppy disk (FD), and 10 is a hard disk (HD).

Numeral 11 designates an input controller, to which are connected input devices such as a keyboard 12, mouse or a pointing device (PD) 13 and so on. An operator operates the keyboard 12 to thereby indicate operation of the system. The pointer device 13 is provided to indicate processing of image information on CRT 16, in which a mouse is used in the present embodiment. Thereby, a cursor on CRT 16 is moved suitably in X and Y directions to select a command icon on a command menu to perform indication of processing, and perform indication of editing object and indication of depicting position, etc.

Numeral 14 designates a video image memory (VRAM), and 15 designates a display output controller. Data displayed on CRT is developed as bit map data on VRAM 14.

Numeral 17 designates a printer controller, which controls output of data relative to a printer 18 connected. Numeral 1A designates a scanner controller, which controls a scanner 1B connected. Numeral 19 designates an external apparatus controller, which controls operation of an external apparatus through the printer controller 17 or the scanner controller 1A.

The constituent elements of the scanner controller IA and the scanner 1B are essential to PC (image read server) 115 which functions as a scanner server connected to the network, but in client-side apparatuses, for example, PC 111, 112, 121, 122, etc., the constituent elements such as the scanner controller 1A and the scanner 1B owned jointly on the PC 115 side which functions as a scanner server through the communication controller 4 and the communication port 5, as mentioned previously.

It is noted that the constitution of the PC shown in FIG. 2 has the similar constitution, even if the scanner controller and the scanner are physically separate components, or the scanner is one component including the scanner controller.

In the present embodiment, the programs stored in HD 10 may be stored in a storage medium such as FD9 connected directly to the PC, or may be stored in ROM not shown. Further, they may be stored on other apparatuses (such as PC) connected to the network. The programs of the present invention can be supplied to the system or apparatus through the storage media such as FD and HD, or the network.

The PC and servers shown in FIG. 1 are likewise provided with the control constitution shown in FIG. 2, but the devices connected are different.

Figure 3:
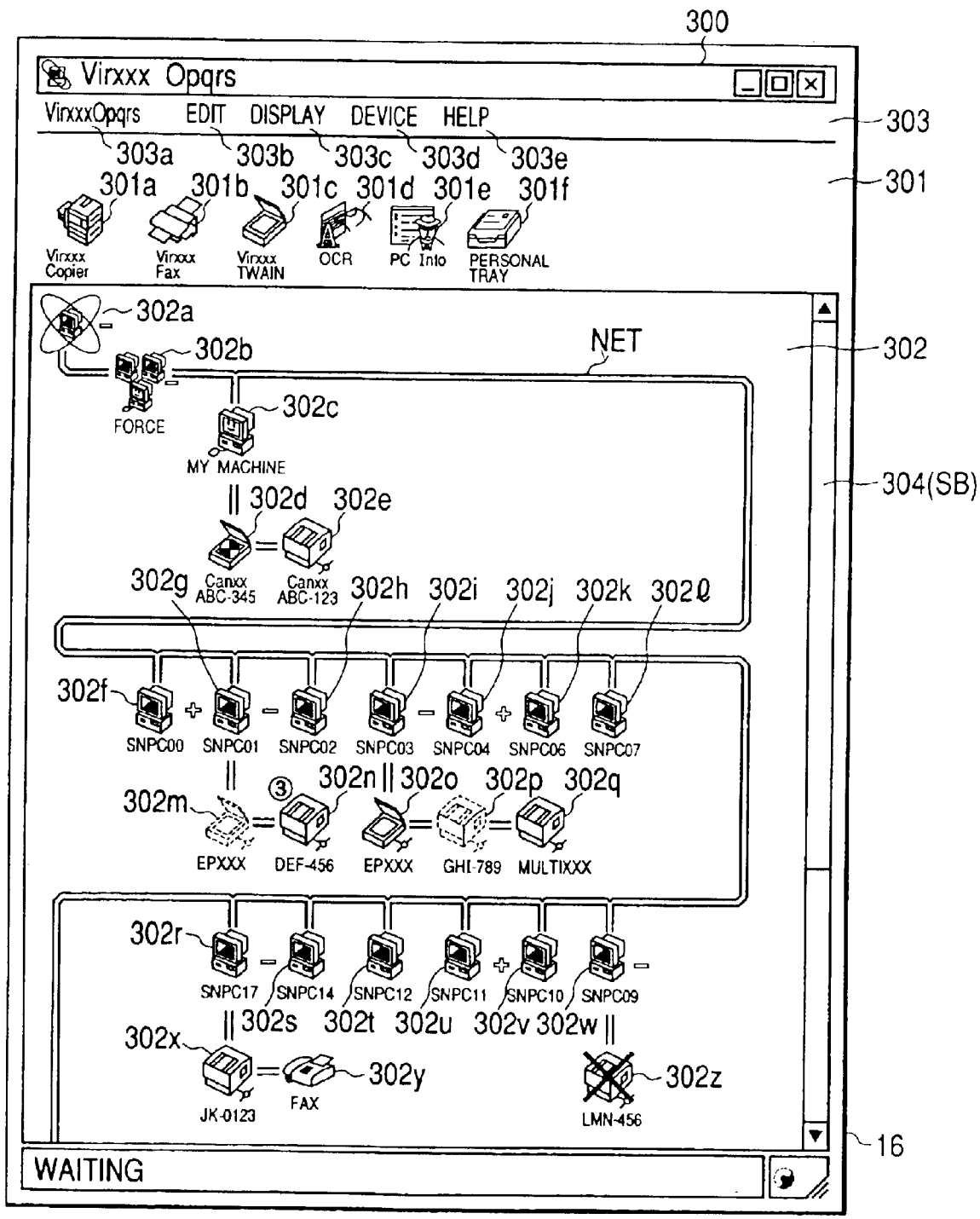
FIG. 3 is a user interface view showing one example of a driver editing screen that can be displayed on a CRT shown in FIG. 2.

FIG. 3 is a view for explaining one example of a device display window 300 displayed on CRT 16 shown in FIG. 2. The device display window 300 is displayed on CRT 16 of PC 111 in Step S202 of a flow chart shown in FIG. 10 and Step (3) of a flow chart shown in FIG. 21, described later.

In FIG. 3, numeral 300 designates a main window in a driver editing user interface, which displays a menu, a tool bar, and a system display window. Numeral 301 designates a tool bar, which displays icons 301*a* to 301*f* of functions performed by operating PC and devices connected to the network. Numeral 303 designates a menu bar, which displays menus of a main menu 303*a*, editing 303*b*; a display 303*c*, a device 303*d*, and a held 303*e*.

Numeral 302 designates a system display window, and a window for schematically displaying the information processing system shown in FIG. 1, which displays icons 302*a* to 302*z* representative of PC and devices connected to the network. For example, the icon 301*c* executes and indicates reading of image data from a scanner corresponding to the icon selected on the system display window 302.

The icons 302*a* to 302*z* indicate PC and devices owned jointly on the network. In these icons 302*a* to 302*z*, PC, a printer, a scanner, a FAX modem, a network printer such as a printer 102 shown in FIG. 1, a network scanner such as a scanner 110 shown in FIG. 1, kinds of devices such as a copier, or display forms of icon changed by status such as "processing" or "occurrence of error" are displayed on the system display window 302.

Numeral 302*a* designates a route icon, numeral 302*b* designates an icon representative of a domain in which my machine is logged on, and numeral 302*c* designates an icon representative to my machine, which corresponds to PC 111 shown in FIG. 1. My machine, which is a special device, is displayed separately from other PC connected to the network. In FIG. 3, the information processing apparatus of my machine is connected to the same LAN as other PC, but is displayed on the end of a paragraph different from other PC.

As shown in FIG. 3, in the system display window 302, the devices (including an information processing apparatus, peripheral processing apparatuses) are divided into three ends of a paragraph; and my machine and peripheral devices connected in local to my machine are displayed in the uppermost end of a paragraph, and other devices are displayed in the second, third . . . ends of a paragraph. PC and devices, which are owned jointly on the network as in icons 302*m* and 302*p* but in which no driver is installed on my machine, are displayed in gray in display shape of icon.

Further, the display form of icon 302*d* shows that the scanner is now scanning. In the display form of icon 302*n*, specific mark information showing that three jobs ((3) in the figure) are spooled in this printer is displayed near the printer icon 302*n*. In the display form of icon 302*z*, specific mark information (x in the figure) showing that a driver of a device shown by icon 30*n* is installed in my machine but is in a unusable state for some reason is displayed so to be superposed on the icon.

As described above, the connecting state and status of all PCS and devices on the network can be assured by the device display window 300. While in the device display window 300 shown in FIG. 3, all the icons showing PC and device on the network are not displayed for convenience sake of the screen, the status of all PC an devices can be assured using a scroll bar 304 arranged on the side of the screen.

While in the present embodiment, all devices on the network are devices under a domain 302*b* in which the machine 302*c* is logged in, they are not limited thereto but may be devices included in an IP address controlled by a router 302*a*.

Figure 4:
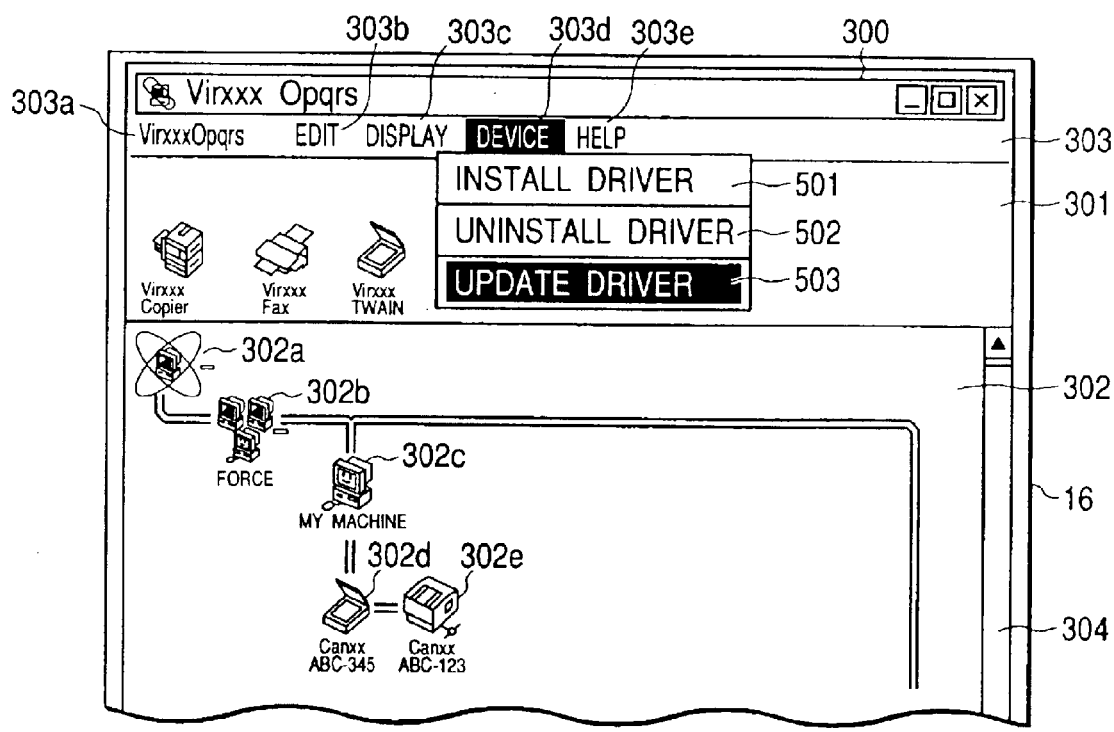
FIG. 4 is a view showing one example of an operating screen for performing installing indication that can be displayed by the data processing apparatus shown in FIG. 2.

FIG. 4 is a view for explaining one example of an operating method on the device display window 300 displayed on CRT 16 shown in FIG. 2. Here, an operating method where a version of a driver of a device is checked to indicate updating will be explained as an example.

In FIG. 4, numerals 501 to 503 designate a pull down menu, in which a device 303*d* is displayed when the former is selected by a pointing device 13 such as an electronic pen having a function of a mouse or a digitizer. The present application is executed by selecting the device 303*d* of the menu 303 of the device display window, and performing one operation such as one click of "update driver" within the pull down menus 501 to 503 by a pointing device 13.

In FIG. 4, where in a state that an icon 302*q* showing a printer within the system display window 302 shown in FIG. 3 is selected by the pointing device 13, the pull down menu "update driver" 503 is executed by one operating indication such as one click of the pointing device 13, the version of a driver of a printer shown by the icon 302*q* is checked to perform updating process of the driver.

Further, where a domain icon 302*b* is selected to perform similar operation, versions of drivers of all devices within the domain installed on PC of my machine are checked to perform updating process of the driver. Where the versions of all drivers are checked, checking process of the versions of the drivers of all devices can be performed by one operation, while it takes processing time for transmitting and receiving many data on the network, and load is given to the traffic of the network.

Where the version of the driver of the device selected is checked, since the checking process of version can be done only with respect to necessary device, processing time is short, and much load is not given to the traffic of the network. However, it is necessary for a user to check which version of a driver out of all drivers is updated.

Where in a state that an icon 302*p* showing a printer within the system display window 302 shown in FIG. 3 is selected by the pointing device 13, the pull down menu "install driver" 501 is executed by one operating indication such as one click of the pointing device 13, driver information of a printer shown by the icon 302p is down loaded from a control server shown by the domain icon 302b, and the printer driver is automatically installed within my machine on the basis of the down-loaded driver information. In the present embodiment, the driver information is a driver installer, which is a software program which is automatically executed upon completion of down-load to install the corresponding device driver. The control server shown by the domain 302b holds the driver setting information (installer) of all devices thereunder. The driver information may not be the driver installer, but it is possible to down-load the module constituting the printer driver in my machine, copy the downloaded module in OS of my machine, rewrite a registry, and perform installing. In this case, the present information control program itself has an automatic install function of a driver so that the driver information down-loaded from the control server can be installed on my machine. The automatic install function is not only the installation of a driver module, but is processing for automatically setting an IP address or a port to a usable environment without being done by a user. The present control program is to simultaneously receive an IP address or a port number as driver setting information from the control server.

Figure 5:
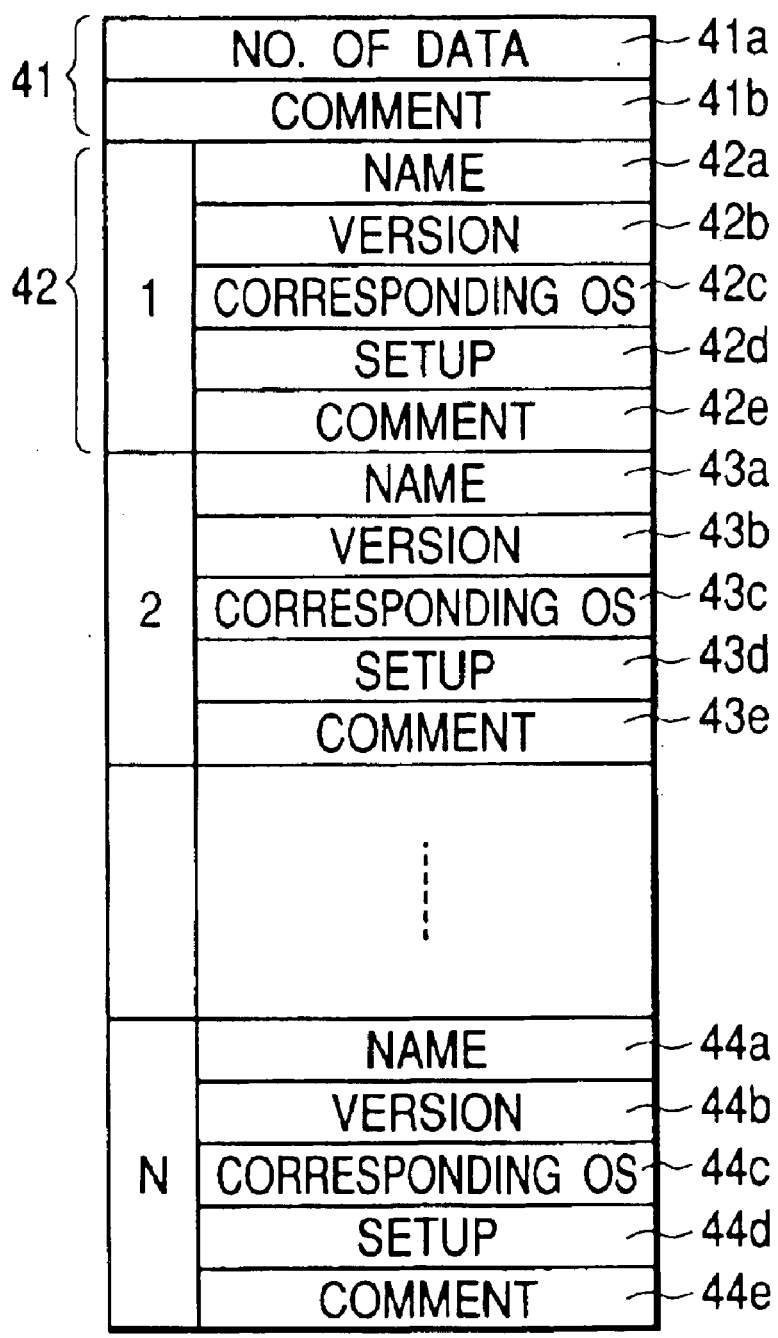
FIG. 5 is a view for explaining the data construction of driver setting information controlled by the data processing apparatus shown in FIG. 2.

FIG. 5 is a view for explaining one example of the data construction of driver setting information of various devices such as the device on the network stored in PMEM 3, HD 10, etc. of the control server 103 shown in FIG. 1.

In FIG. 5, numeral 41 designates a header section, which has an area 41a for storing registered number of driver setting information controlled by the control server 103 (No. of data), and an area 41b for storing comments.

Numeral 42 designates a data section. Numeral 42a designates an area for storing name of a driver registered. Numeral 42b designates an area for storing version information of a driver registered. Numeral 42c designates an area for storing OS information to which driver registered corresponds. OS information include Windows 95/98, Windows NT3.51, WINDOWS 4.0, WINDOWS 2000, MS-DOS, Macintosh (further, USB connection, serial connection, Ethernet connection), UNIX (goods name), etc. Numeral 42d designates an area for storing driver setting information. Numeral 42e designates an area for storing comments.

Likewise, stored in the data section 42 are data comprising one set of names of drivers in number registered stored in the area 41a, version information, corresponding OS information, and comments.

The driver setting information herein is information data acquired by installing drivers of devices in PC connected to the network, extracting data and information necessary for installing the drivers of the devices, and preparing other driver information such as version information.

Where the control server 103 for controlling driver setting information in a one-dimensional manner is not present, devices are connected. Or, driver setting information is controlled by PC which controls the devices.

Figure 6:
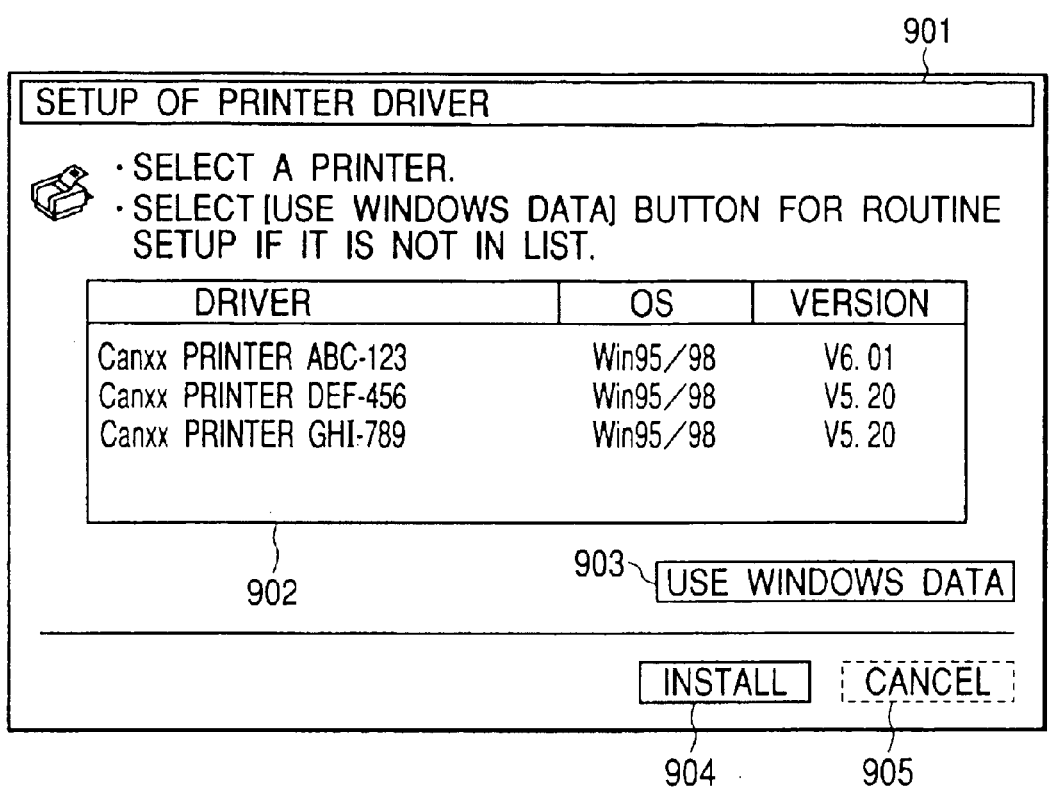
FIG. 6 is a view showing one example of a list of driver setting information that can be controlled by the data processing apparatus shown in FIG. 2.

FIG. 6 is a view showing one example of a list of driver setting information capable of being displayed by the information processing apparatus shown in FIG. 2. In the user interface screen of FIG. 6, wherein a display state that any device icon is not selected in my machine 302c, "Install driver" 501 in FIG. 4 is indicated in execution, driver information is acquired from the control server, and that is displayed on the basis of the acquired driver information.

In FIG. 6, numeral 901 designates a main window, and numeral 902 designates a list, displaying a driver name, a corresponding OS, and a version number.

Numeral 903 designates a button for switching, setting information, which is selected where setting information of default prepared in advance in the system within my machine is used. When this button 903 is selected, the function is switched to the driver install function of OS to shift to the normal setup process. Numeral 904 designates an install executing button. When this button 904 is selected, the installation of a driver is executed on the basis of the driver setting information selected from the list 902.

Numeral 905 designates a cancel button, and when this button is selected, installing of a driver is stopped.

Figure 7:
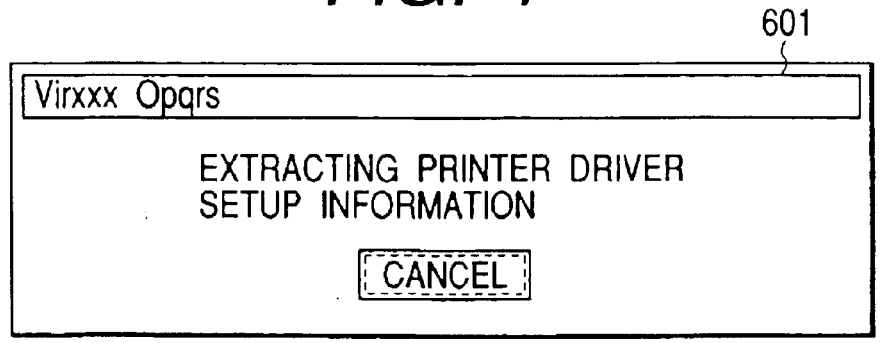
FIG. 7 is a view showing one example of messages displayed on the data processing apparatus shown in FIG. 2.
Figure 8:
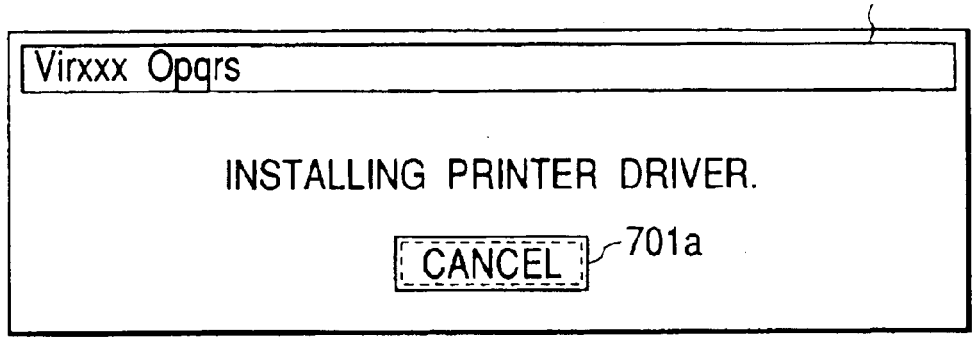
FIG. 8 is a view showing one example of messages displayed on the data processing apparatus shown in FIG. 2.
Figure 9:
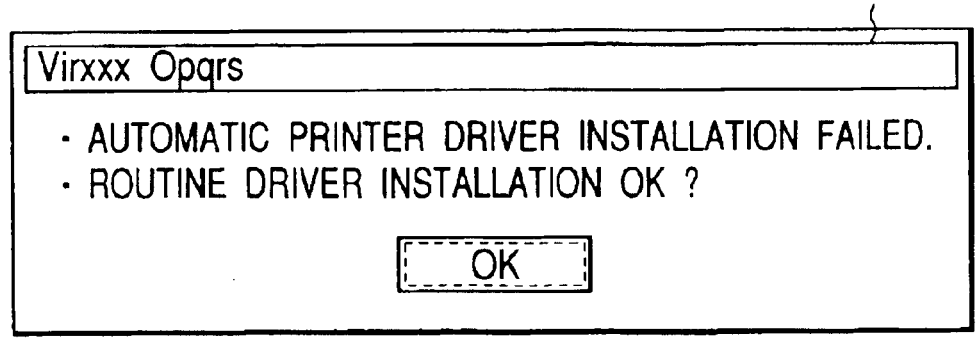
FIG. 9 is a view showing one example of messages displayed on the data processing apparatus shown in FIG. 2.

FIGS. 7 to 9 are respectively views showing one example of a message dialogue displayed on CRT 16 of the information processing apparatus shown in FIG. 2. FIG. 7 shows a dialogue displayed when a driver is extracted from a control server described, FIG. 8 is a dialogue displayed during installation of driver by the information processing apparatus of my machine, and FIG. 9 shows a dialogue displayed as an error where driver setting information is not present in the control server.

Figure 10:
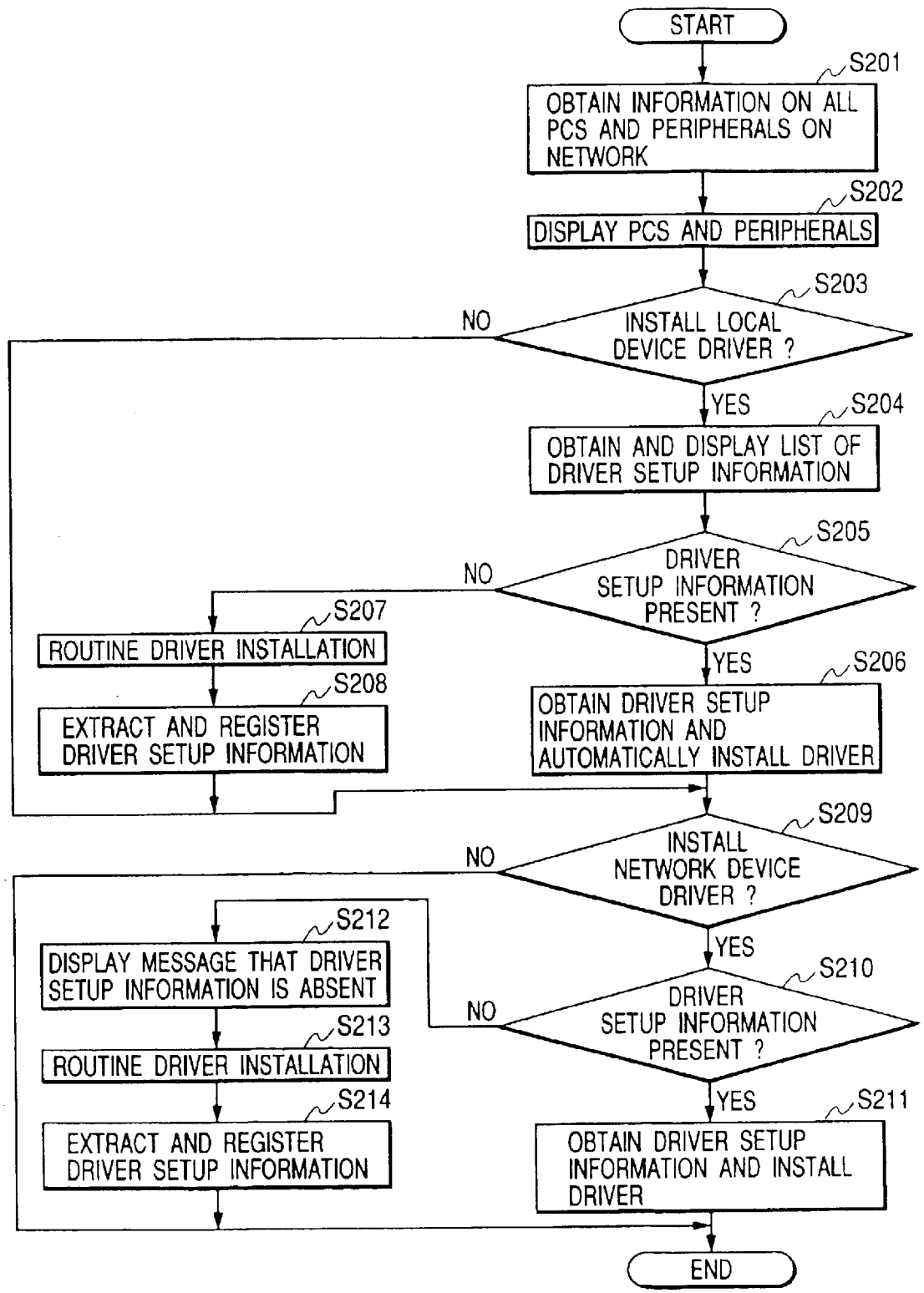
FIG. 10 is a flowchart showing one example of a first data processing procedure in the data processing apparatus according to the present invention.

FIG. 10 is a flow chart showing one example of a first data processing procedure in the information processing apparatus according to the present invention, corresponding to a driver install processing procedure relative to peripheral devices on the network. S201 to S214 denote the Steps. The present processing is executed where the device display window shown in FIG. 3 is opened, or where "Update to latest information" within the display 303 of the menu bar 303 is indicated.

First, in Step S201, CPU 2 of my machine, the information processing apparatus requests the control server 103 to acquire connection information of all PCs and peripheral devices owned jointly on the network and information using circumstances and status of these devices through the communication controller 4 to acquire the using circumstances and status information of devices from the control server 103. This information is stored on PMEM 3. The control server 103 is the domain server 302b shown in FIG. 3 in the present embodiment. My machine 302c acquires information from the control server 302c using the fixed procedure for communication between devices supported by WINDOWS NT.

Next, in Step S202, CPU 2 forms PCs and peripheral devices into a source of a user interface screen as shown in FIG. 3 in accordance with the present control program, on the basis of information acquired from the control server 302b to display it on CRT 16 using the function of OS. Those which are operating or those which cannot be used are displayed so that they can be visually distinguished, as described above.

Then, in Step S203, CPU 2 judges whether or not the driver of the local device is installed. This can be accomplished by CPU 2 which judges whether or not, in the system display window 302 of FIG. 3, the device (in FIG. 3, either 302d or 302c) under my machine 302 is selected by the pointing device, and "Install driver" 501 in the pull down menu shown in FIG. 4 is selected and executed. Where a judgment is made that indication of installing a driver of a local device is not done, the Step proceeds to Step S209, and where a judgment is made that indication of installing a driver of a local device is done, the Step proceeds to Step 5204.

In Step S204, the present information processing apparatus acquires a list of driver setting information from the control server 103 of FIG. 1, produces the user interface screen for setting up shown in FIG. 6, and displays it on CRT16 using function of OS. Where the control server is not present, the apparatus gives all PCs on the network a request in a broadcast to acquire driver setting information controlled by PC (information processing apparatus) or the peripheral device (101 in FIG. 1) having a server function directly connected to the network, and likewise prepares and displays a list. Here, the driver setting information is information such as a set file (DLL file), a driver file, etc. necessary for installing a device driver. This may be a file in the execution form like the driver installer as mentioned previously.

Next, in Step S205, CPU 2 judges whether or not the driver setting information is in a list. Where a judgment is made that the driver setting information is in a list, the Step proceeds to Step S206. In the judgment in Step S205, CPU 2 may judge automatically, or whether or not an install execution 904 button is selected by a user, or a Windows data using 903 button is selected, whereby CPU 2 may judge it.

In Step S206, driver setting information is acquired from PC (for example, 3028 or 3021 in FIG. 3) which controls the control server 103 or selected peripheral devices to automatically install the driver. At that time, when a driver is being installed, a message relating to the install processing shown in FIG. 8 is displayed on CRT16. In this automatic installation, installation of a driver module is automatically carried out, and setting of an IP address, a port number and so on are also automatically carried out.

On the other hand, where in Step S205, a judgment is made that driver setting information that should be installed in a list by CPU 2 is not present, or where in the user interface screen of FIG. 6, a user selects Windows data using 903 button, the Step proceeds to Step S207, where routine process for installing a driver prepared by the system is carried out. In Step S208, CPU 2 extracts driver information installed from the system of my machine, prepares driver setting information as shown in FIG. 5, and transmits driver setting information to the control server 103 in order to register the prepared driver setting information in the control server 103. At that time, a message relating to the driver extraction shown in FIG. 7 is displayed. Where the control server is not present, driver setting information is controlled by my machine.

Next, in Step S209, CPU 2 judges whether or not a driver of a network device is installed. This is realized by CPU 2 which judges whether or not, in the system display window 302 of FIG. 3, a device (in FIG. 3, either 302m or 302n) under other information processing apparatus 302 is selected by a pointing device, and "Install a driver" 501 in the pull down menu shown in FIG. 4 is selected. Also where in the system display window 302 in FIG. 3, a domain icon 302b is selected by a pointing device, and "Install a driver" 501 is selected, and executed, a judgment is made as indication for installing a driver of a network device. Where indication for installing a driver of a network device (as an indication method, for example, in FIG. 4, a printer 302p in which a driver is not installed is indicated by a mouse) is done, the Step proceeds to Step S210.

In Step S210, CPU 2 of my machine inquires the control server 103 whether or not driver setting information of the peripheral device selected is present, and where the control server responded "not present", CPU 2 of my machine further inquires whether or not driver setting information is present in PC for controlling the peripheral device selected, to judge whether or not driver setting information is present in the control server 103 or PC for controlling peripheral devices. In the case of indication of installation in a state that a domain icon 302b is selected, installation of drivers of all peripheral devices under control of the control server 103 corresponding to the domain icon is indicated, and since the driver of the peripheral device under control of the control server 103 holds driver setting information in the control server 103, a judgment is made that driver setting information is present in the control server.

Where judgment is made that driver setting information is present, the Step proceeds to Step 211, where driver setting information is acquired from the control server or PC for controlling the peripheral device selected, and processing similar to the local device is carried out to install a driver. At that time, a message shown in FIG. 8 is displayed during installation of a driver.

On the other hand, where my machine judges that driver setting information is not present in either the control server 103 or PC for controlling the peripheral device, the Step proceeds to Step S212, where the fact that necessary driver setting information is not present is displayed, by a message, as shown in FIG. 9.

In Step S213, routine driver installing processing prepared by the system is carried out. That is, installation of a driver is manually carried out by a user using the function of OS. Driver setting information used is one down-loaded by indication of a user from CD-ROM or a home page of sales company. In Step S214, CPU 2 of my machine performs extraction of driver information installed, prepares driver setting information as shown in FIG. 5, and registers the prepared driver setting information in the control server. Where the control server is not present; driver setting information is transmitted to the control server, 103 in order to register driver setting information in PC for controlling the selected peripheral device. A message shown in FIG. 7 is displayed during extraction of driver information. Then, processing is terminated.

As described above, according to the first data processing procedure, where in PCS owned jointly on the network and the window on which peripheral devices are displayed, a driver is not installed when these devices are used, the driver can be installed in a simple operation to improve work efficiency.

While in the above-described first embodiment, a judgment is made whether or not a driver is installed within application to extract necessary driver setting information, a user sometimes executes processing for installing a driver other than the present application. In this case, necessary driver setting information is not extracted. So, means are provided to monitor if a driver is newly installed so that necessary driver setting information is extracted. This embodiment will be explained hereinafter.

Figure 11:
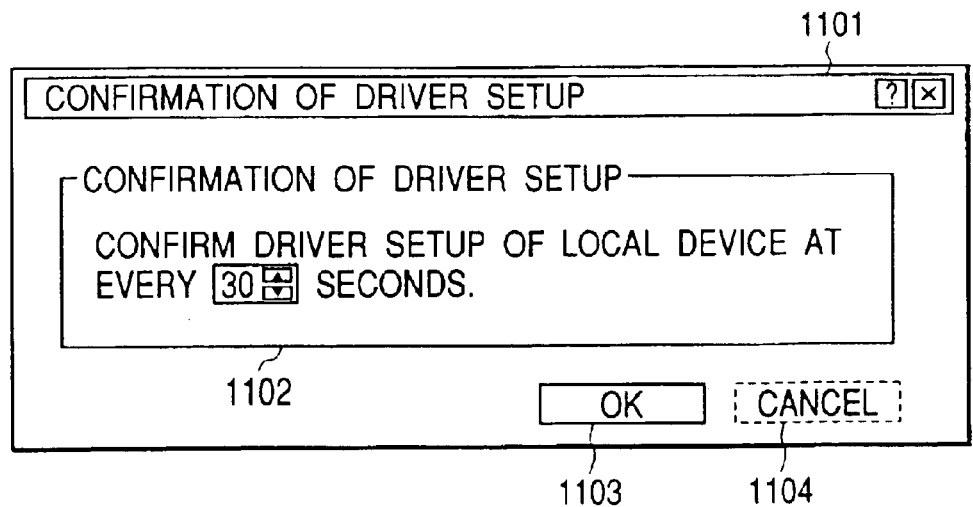
FIG. 11 is a view showing one example of a driver state confirmation setup screen in the data processing apparatus showing a second embodiment of the present invention.

FIG. 11 is a view showing one example of a driver state confirmation setup screen in the information processing apparatus according to the present invention. The hard construction is similar to that shown in FIG. 1.

In the figure, numeral 1101 designates a main window; 1102 confirming time intervals; 1103 a setup execution button; and 1104 a cancel button.

CPU 2 confirms a state of a driver of a local device set to my machine on the basis of the present second data processing procedure every time set in this screen.

There is a case where if the installing process prepared by the system was executed to install a driver, means for notifying each application that a driver was installed is prepared on the system side. In this case, it is possible to detect that a driver was newly installed by monitoring such a notice as described.

Figure 12:
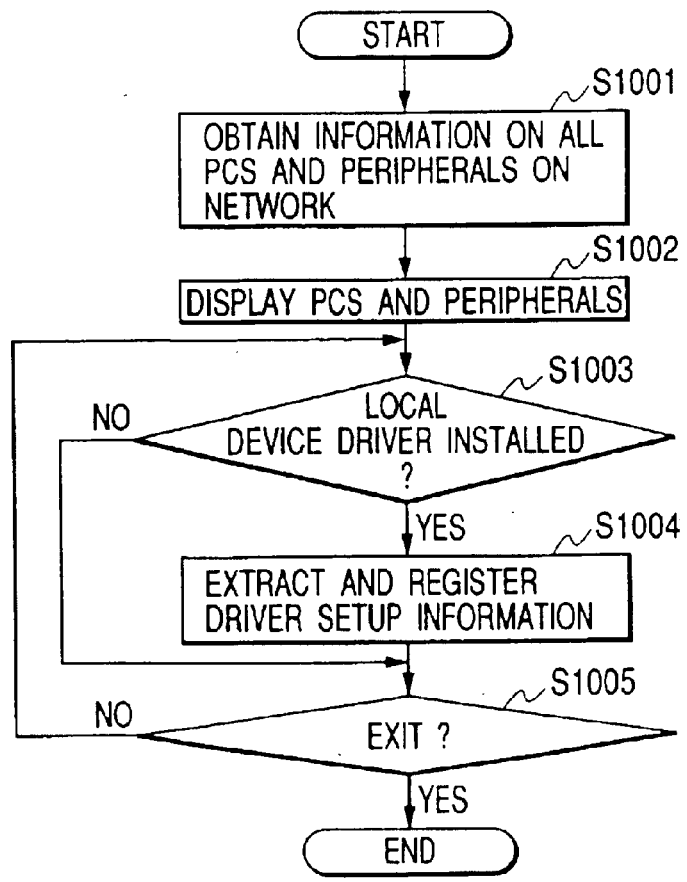
FIG. 12 is a flowchart showing one example of a second data processing procedure in the data processing apparatus according to the present invention.

FIG. 12 is a flow chart showing one example of the second data processing procedure in the information processing apparatus according to the present invention. S1001 to S1005 indicate the Steps. The present processing is executed where the device display window shown in FIG. 3 is opened, or where "Update to latest information" within the display 303c of the menu bar 303 is indicated.

First, in Step S1001, CPU 2 of my machine inquires the control server 103 or PC for controlling peripheral devices about connecting information of all PCs owned jointly on the network through the communication controller 4, using state and status information of these devices to acquire the using circumstances and status information. This information is stored in PMEM3.

Then, in Step S1002, CPU 2 of my machine produces a source of a user interface screen as shown in FIG. 2 in PC and peripheral devices on the basis of the acquired information to display it on the screen using function of OS. Those being operated and those that cannot be used are displayed so that they may be visually discriminated.

Next, in Step S1003, CPU 2 of my machine judges whether or not a device connected in local to my machine is newly installed, or a driver of latest version is installed. As a method for judgment, for example, updating state of a driver is judged at fixed time intervals set on the set screen shown in FIG. 11.

Where the fact that a driver is newly installed or a version of a driver becomes new is judged by CPU 2, the Step proceeds to Step S1004, where CPU 2 extracts driver setting information installed newly on my machine, and transmits driver setting information to the control server 103 in order to prepare driver setting information as shown in FIG. 5 to register it in the control server. Where the control server is not present, it is controlled by my machine.

On the other hand, where in Step S1003, judgment is made that a driver is not newly installed or a version of a driver is hot changed, judgment is made in Step S1005 whether or not application (device display window shown in FIG. 3) is ended, and where judgment is made to be an end, the application is ended, while where judgment is made not to be an end, the Step returns to Step S1003 to continue processing.

As described above, in the above-described embodiment, connecting information and status information of the peripheral devices on the network are acquired, and the circumstances of the constitution of the current system and the peripheral devices constituting the system are discriminated and display visually on the same screen by the icon on the display device of my machine. The description has been made of the case where when the drivers of the peripheral devices owned jointly by the network are connected to the control server or connected in local, driver setting information necessary for setting up the drivers are acquired from PC to install them on a device manager or the like of my machine, and the peripheral devices are set up to a state capable of being normally operated.

However, when the connecting information of all PCs owned jointly on the network and the peripheral devices is displayed on one screen, discrimination between that is selected by a user for use and that is not selected is impaired, which cannot softly respond to a user's request for discrimination between the favorite peripheral devices and others, and which requires operation for selecting drivers as intended when a driver of a device is installed, and it is therefore contemplated that installing operation is cumbersome for an inexperienced user.

So, there can be constituted such that a favorite display and a routine display are displayed on divided screens, and icons displayed on the respective screens are dragged and dropped whereby if unregistered, the favorite screen is displayed and at the same time, driver information is acquired from a control server or PC connected in local to automatically install it or said driver for dragging and dropping the icon already displayed on the favorite to the routine display screen can be automatically deleted; and constituted such that installing/uninstalling of a driver is carried out simply for the user first, and the driver environment of devices owned jointly on the present network capable of being operated can be recognized easily. This embodiment will be described below.

Figure 13:
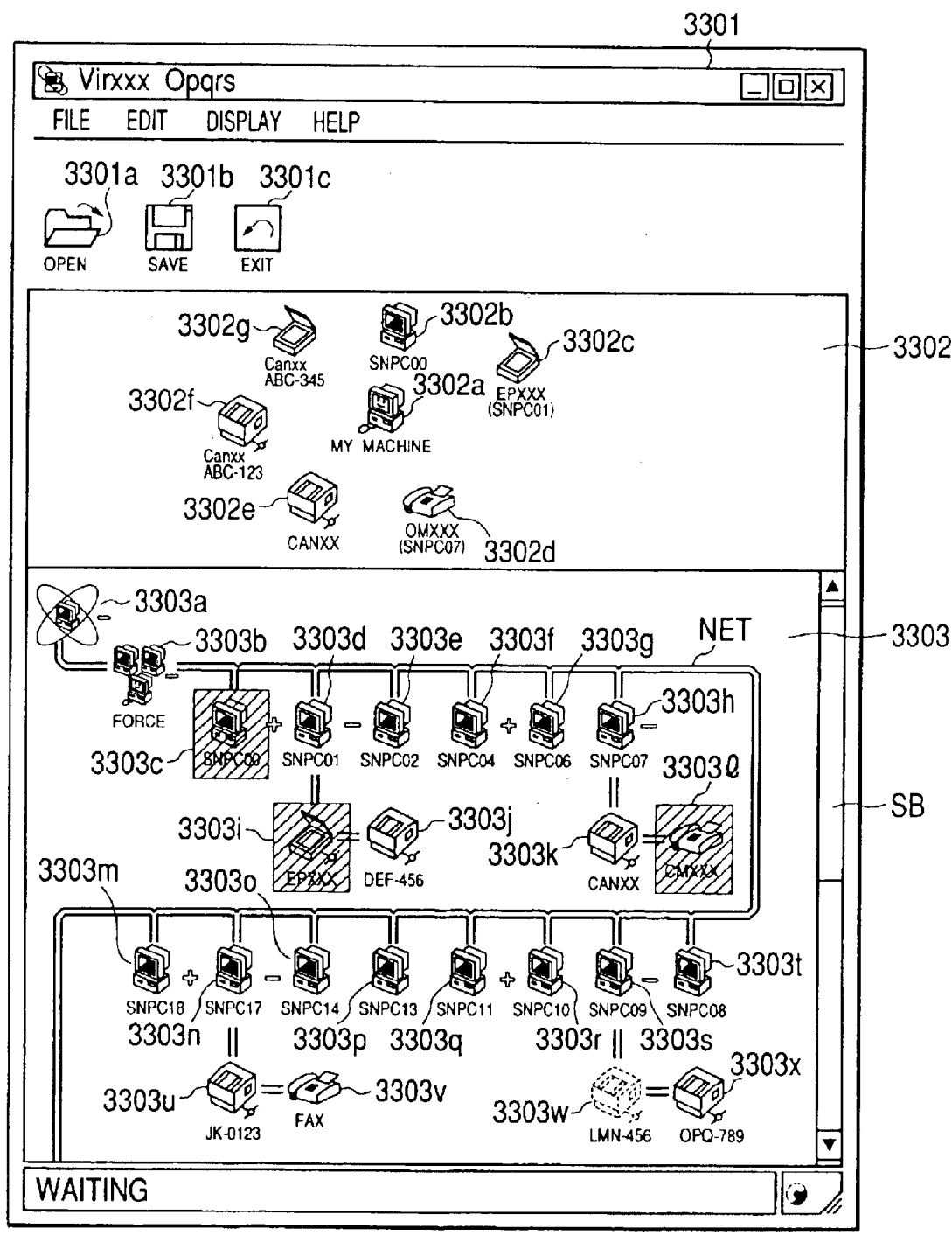
FIG. 13 is a view showing one example of a driver control editing screen in the data processing apparatus showing a third embodiment of the present invention.
Figure 14:
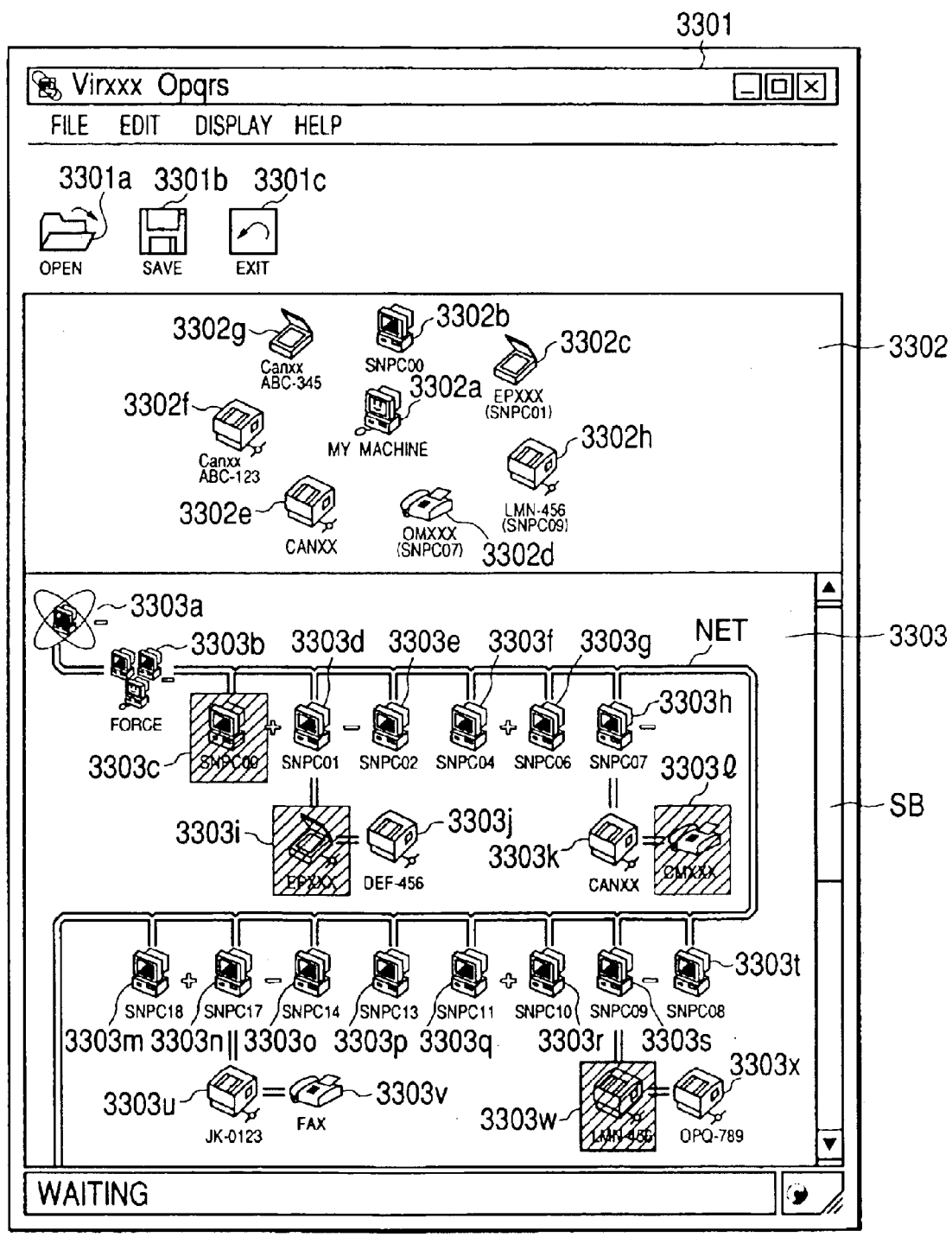
FIG. 14 is a view showing one example of a driver control editing screen in the data processing apparatus showing a third embodiment of the present invention.

FIGS. 13 and 14 are respectively views showing an example of a driver control editing screen in the information processing apparatus according to the present invention. In the present embodiment, the display method includes two kinds, a "routine display" for displaying all PCs or peripheral devices on the network and a "favorite display" for displaying only PCs or peripheral devices registered. In the following, information data for displaying only a specific device out of PCs or peripheral devices on the network is referred to as "favorite display setting data".

In FIGS. 13 and 14, numeral 3301 designates a main window on which a menu, a tool bar, and an icon representative of PC and peripheral devices are displayed.

Icons 3301a to 3301c are editing icons in which displaying and editing of favorite are done by the tool bar. "Open" icon 3301a is an icon for reading "Favorite display setting data" registered already in my machine. By executing it, the "Favorite display setting data" registered is read, and the favorite device or peripheral device is displayed on the "Favorite display" window shown at 3302.

"Storage" icon 3301b is a button for changing a device position in the "Favorite display" window 3302, newly registering the favorite device from the "Routine display" window 3303, and, where the favorite device in the "Favorite display" window is deleted or updated, for storing the content of change in "Favorite display setting data".

"End" icon 3301c is provided to end (terminate) change of "Favorite display setting data". When the "End" icon is selected, the "Favorite display" window 3302 is erased.

In the main window 3301, numeral 3302 designates "Favorite display" window, which corresponds to a state that the PC and peripheral device registered in "Favorite display setting data" are displayed. Numerals 3302a to 33028 designate icons, which correspond to the PC and peripheral device registered in "Favorite display" window 3302. Within the "Favorite display" window 3302, a position of a device can be arranged by being dragged to a favorite position about "My machine" 3302a which is my machine.

Numeral 3303 designates "Routine display" window, which corresponds to a state that all PCs and peripheral devices on the network under control of a control server (domain server) 103 shown at domain 3303b or within the same router shown by a route icon 3303a.

As described above, these icons 3302a to 33028 are displayed where the display form of icons is changed by the status of a printer, a scanner, kind of devices such as FAX modem, or "processing", or "error occurs".

In the "Favorite display" window 3302, numeral 3302a designates an icon representative of my machine, and my machine is displayed separately from other PCs because the former is a special device.

Numerals 3302b to 33028 designate icons, which display PCs or peripheral devices registered in the favorite display.

In default, a screen display arranged on a circle about the icon 3302a for easy operation is done.

A position of an icon can be freely changed by a user by operating a mouse as the pointing device 13 shown in FIG. 2.

In the routine display window 3303, numerals 3303a to 3303x designate icons, which indicate all PCs and peripheral devices on the network. While in the present embodiment, all icons are not displayed for the sake of convenience of the screen, all PCs and peripheral devices can be confirmed using a scroll bar SB arranged on the side of the screen.

The PCs and peripheral devices already registered in the favorite display as in the icons 3303c, 33031 and 33031 are displayed with the display shape of icons changed, and registration can be visually discriminated and confirmed.

A device which is owned jointly on the network as in the icon 3303w but a printer driver is not installed on my machine in PC is displayed in gray (shown by diagonal lines in the figure).

As described above, if a user looks at the device editing display screen shown in FIGS. 13 and 14 (which is displayed by down-loading from the home page of sales company through FD or CD-ROM shown in FIG. 1 or the communication line, installing an application program described later and starting the application), the connecting state and status of all PCs and peripheral devices on the network can be confirmed.

Figures 15, 16:
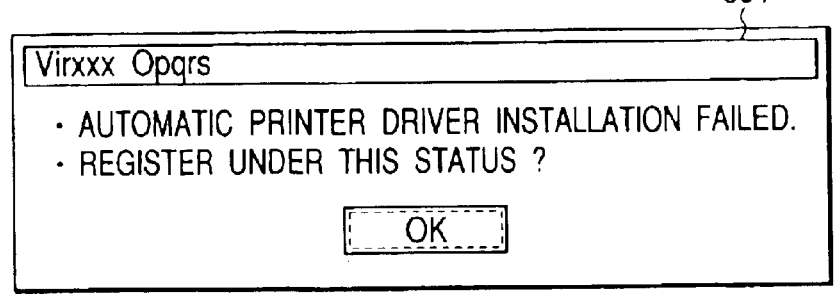
FIG. 15 is a view showing one example of the construction of favorite display setting data to be displayed on a "Favorite display" Window shown in FIGS. 13 and 14.
FIG. 16 is a view showing one example of driver install messages displayed on CRT shown in FIG. 2.

FIG. 15 is a view showing one example of the construction of "Favorite display setting data" to be, displayed on the "favorite display" window 3302 shown in FIGS. 13 and 14, comprising a header section 16 and a data section 62.

In the header section 61, numeral 61a designates a machine name which prepared data. The machine name will suffice if a device can be decided uniformly, and may be a machine appellation or may be IP address of TCP/IP protocol.

Numeral 61b designates an appellation of a prepared person. This appellation may be an appellation which is logged on the machine, or may be other appellations. Numeral 61c designates a date prepared. Numeral 61d designates data number, and number of PC or peripheral devices registered is set. Numeral 61e designates a comment.

In the data section 62, numeral 62a designates an appellation of devices registered, and 62b designates attribute data. The attribute data represents kinds of devices or the like, such as a PC, a printer, a scanner, a FAX modem and so on.

Numeral 62c designates status information, which include information such as "Using", "Paper run out", "Driver not installed", etc. Numeral 61d designates display position information, which is information for showing a display position in the "Favorite display" window 3302 of the icon corresponding to the device. Numeral 62c designates a comment suitably prepared by a user.

Likewise, only the number of registrations (for example, 1 to N) stored in the data number 61d of the data section 62 are stored.

FIG. 16 is a view showing one example of a driver install message displayed on CRT 16 shown in FIG. 2, which is displayed where driver setting information is not present. Display timing will be described in detail in a flow chart shown in FIG. 17.

FIG. 17 is a flow chart showing one example of a third data processing procedure in the information processing apparatus according to the present invention. S2201 to S2212 indicate the Steps. The construction of data, acquired from the control server 103 or the like is similar to FIG. 5 in the first embodiment. The present processing is executed where the device display window shown in FIGS. 3 and 13 is opened, or where indication of "Update to latest information" within the display 303c of the menu bar 303 in FIG. 3 (as well as FIG. 13) is made.

First, in Step S2201, when the application for editing the favorite display is started, CPU 2 of my machine requests from the control server 103 the connecting information of all PCs owned jointly on the network and peripheral devices, the using circumstances of these devices, status information, and acquires the using circumstances of devices and status information from the control server 103. CPU 2 then stores these information on PMEM3 shown in FIG. 2.

Next, in Step S2202, CPU 2 acquires favorite display information stored in a memory (PMEM3 or external devices 9, 10) of my machine. In Step S2203, CPU 2 produces a source of a user interface screen showing the routine display window 3303 and the favorite display window 3302 on the basis of information acquired in Step S2201 and registration information acquired in Step S2202 to display the favorite display window 3302 and the routine display window 3303 on one and the same screen (see FIGS. 13 and 14) using function of OS.

Next, in Step S2204, CPU,2 performs registration of PCs and peripheral devices in the favorite display setup. As the registration operating method, for example, the ions of devices are dragged and dropped from the routine display window 3303 to the favorite display window 3302 by operating a mouse or the pointing device 13 shown in FIG. 2, whereby the icon can be registered at a position from which mouse is released.

Conversely, the favorite display registration can be deleted by dragging and dropping the icon from the favorite display window 3302 to the routine display window 3303.

In this registration processing, in Step S2205, the status of a device to be registered is examined to judge if the driver need be installed. Where an icon which is not installed to be usable for the information processing apparatus of my machine is dragged and dropped from the routine display window 3303 to the favorite display window 3302, judgment is made that the driver need be installed.

There are some methods for judging whether or not information for setting a driver of the designated device. For example, there is contemplated a case where a control server for controlling setting information of drivers in one-dimensional manner is present. In this case, information of a device for installing a driver on the control server is transmitted to thereby judge if necessary setting information is present. Items for judgment include kinds of drivers, corresponding OS information and the like.

Where judgment is made that a driver need not be set, the Step proceeds to Step S2205, and where judgment is made that a driver need be set, the Step proceeds to Step S2206. In Step S2206, judgment is made of the presence or absence of setting information of driver by the above-described method, and if judgment is made that setting information is present, the Step proceeds to Step S2207. In Step S2207, CPU 2 transmits a request for acquiring necessary driver setting information to the control server or PC for controlling the designated device, acquires driver setting information from the control server 103 or PC according to the request for acquiring, and installs a driver in my machine on the basis of the driver setting information acquired.

At that time, a message showing "install-processing" is displayed as shown in FIG. 8. However, when "cancel" is indicated on the screen shown in FIG. 8, the install-processing can be stopped.

On the other hand, in Step S2206, where judgment is made that setting information is not present, the Step proceeds to Step S2112 to show the content that the driver cannot be installed because setting information is not present. For example, an error message as shown in FIG. 16 is reduced, which is displayed on CRT 16 using function of OS.

Next, in Step S2208, device information of devices registered in the favorite display window 3302 and positions thereof in the favorite display window 3302 are calculated, the designated devices are registered in the favorite display setting data, and the changed setting data is stored as temporary storage data. In Step S2209, the favorite display window and the routine display window are changed in display on the basis of the temporary storage data.

Thereby, where an icon 3303w of a printer shown in FIG. 13 is dragged and dropped in a suitable point of the favorite display window, and the driver is normally installed, the display is switched to that shown in FIG. 14.

That is, the icon 3303w of a printer is normally displayed as in the icon 3302h within the favorite window 3302 since the driver is normally installed.

Further, since in the routine display window 3303, the favorite display is registered as in the icon 3303w, the display form is changed to the registered icon display by the present application.

Next, in Step S2210, judgment is done if indication of finishing the favorite display editing was made. If judgment is made that indication of termination is not present, the Step returns to Step S2204, and the favorite display editing is continued.

On the other hand, in a case where it is judged in Step S2210 that the indication of termination is present, the step proceeds to Step 2212, and the temporarily stored favorite display setting data is formally stored to finish the processing.

According to the above-descried embodiment, in editing the favorite display setup on the editing screen in which the window for displaying all owned jointly on the network with respect to PCs and peripheral devices and the window for displaying only those registered are displayed to be seen easily and to be understood easily, they can be registered in a simple operation irrespective of status of devices registered to thereby improve the work efficiency.

As described above, according to the present embodiment, the operating state of the entire system including various common peripheral devices connected on the network and other data processing devices and the respective operating state can be visually discriminated and confirmed on the screen.

Next, a description will be made of a processing for checking updating of drivers of all devices of a plurality of devices connected to the network.

Figure 21:
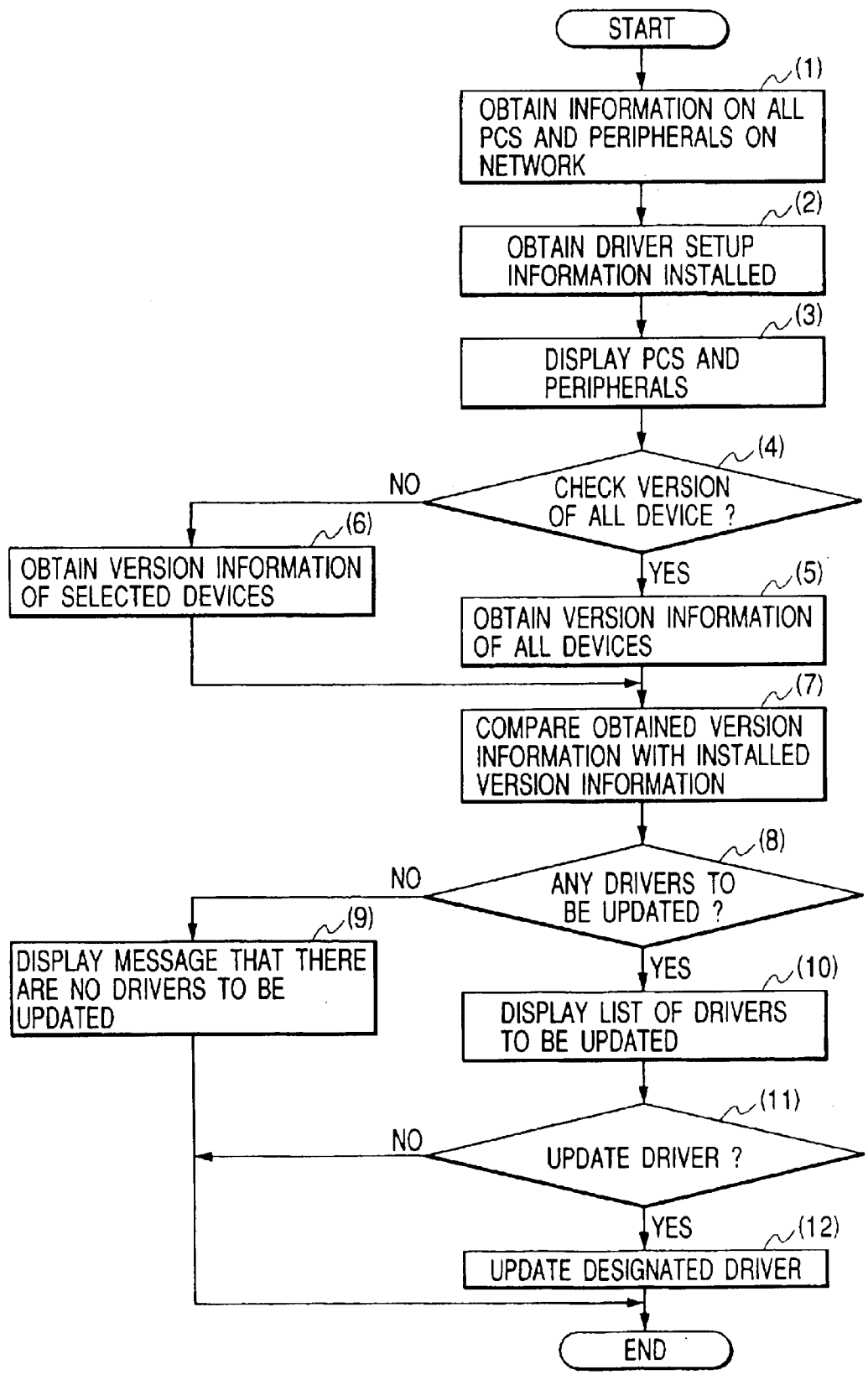
FIG. 21 is a flowchart showing one example of a fourth data processing procedure in the data processing apparatus according to the present invention.

FIG. 21 is a flow chart for explaining one example of a fourth data processing procedure in the information processing apparatus shown in the present embodiment, which corresponds to the processing executed by PC on the network such as PC 111 shown in FIG. 2, corresponding to the processing executed by CPU 2 according to the control program stored in the memory such as HD 10 shown in FIG. 2. (1) to (12) denotes the Steps. In the following, as one example, PC 111 is used as my machine. The present processing is executed where the device display window shown in FIGS. 3 and 13 is opened.

First, CPU 2 of the information processing apparatus acquires the connecting information of all PCs and devices owned jointly on the network, the using circumstances of these devices, and the status information thereof from the control server 103 to store this information in PMEM 3 (1). Then, CPU 2 checks driver setting information of devices installed on my machine to acquire the driver setting information The aforementioned device display window 300 shown in FIG. 3 is displayed on CRT 16 of my machine on the basis of the circumstances and information acquired in Steps (1) and (2) to display all PCs and devices on the network under the control of a domain server 302b (3). Even if the devices to be displayed are all devices within IP address controlled by a router 302a, acquiring of information and display are enabled, as in the aforementioned data processing procedure.

Next, CPU 2 judges whether or not an indication for checking driver's versions of all devices is made, by the menu operation of "Update driver" on the device display window 300 shown in FIG. 4 (4). Here, where a "Update driver" button 503 is selected and executed in the state that the domain server 302b is selected by a pointer device, the driver's versions corresponding to all devices are to be checked; where the "Update driver" button 503 is selected and executed in the state that a "My machine" 302c or my machine is selected by a pointing device, a version of a driver installed on my machine is to be checked; where the "Update driver" button 503 is selected and executed in the state that PC for controlling devices such as 3028 and 3021, or PC connected in local is selected by a pointing device, a version of a driver corresponding to the device controlled by PC or the device connected in local to PC is to be checked; and where the "Update driver" button 503 is selected and executed in the state that the peripheral device itself is selected by a pointing device, a version of a driver corresponding to the selected peripheral device is to be checked.

In a case where an indication is made to check versions of all drivers, CPU 2 of my machine acquires version information of drivers of all devices controlled by the control server 103 from the control server 103 (domain server 302b or router 302a) (5). The Step proceeds to Step (7).

Where an indication is not made to check a version of a driver of the selected device (a driver installed on my machine, or a driver of a device controlled by PC owned jointly, or a driver of the selected peripheral device), CPU 2 acquires version information of the driver of the selected device from the control server 103 (6). The Step proceeds to Step (7). Where the control server 103 is not present, version information of drivers are acquired from PC for controlling the devices. Alternatively, in Steps (5) and (6), driver setting information together with version information may be acquired.

Then, CPU 2 of my machine compares version information acquired from the control server 103 with version information of a driver of a device installed on my machine, and displays a message window 701 shown in FIG. 18 on CRT 16 shown in FIG. 2 of my machine (7).

Next, CPU 2 of my machine judges whether or not the driver of the device installed on my machine need be updated (8). This judgment is accomplished by judging whether or not it is object driver setting information by a driver name and corresponding OS, and if it is the corresponding driver setting information, comparing version numbers. Where version information of the driver acquired from the control server 103 is new as compared with the version of the driver of the device installed, judgment is made that the driver need be updated.

In a case where a device whose driver need be updated is not present, a message window 801 shown in FIG. 19 showing that updating is not necessary is displayed on CRT 16 shown in FIG. 1 (9), and processing is finished.

Figure 22:
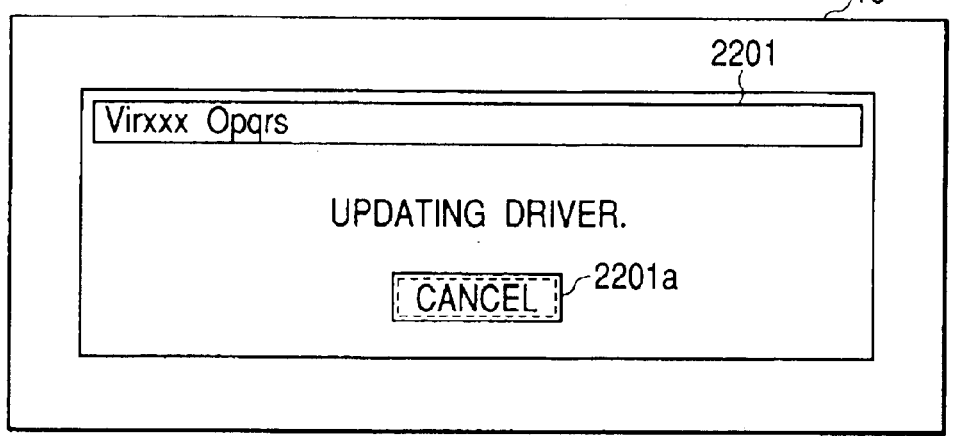
FIG. 22 is a view for explaining one example of a message window displayed on CRT shown in FIG. 2.

In a case where the device whose driver need be updated is present, a check result window 901 shown in FIG. 20 representative of a list of devices which need be updated is displayed (10). CPU 2 of my machine judges whether or not an updating execution button 2003 in FIG. 20 is indicated in execution by one operating indication such as one click by a pointing device, whereby whether or not an indication for updating a driver is present is judged (11).

Where updating indication is not present, processing is finished, and where updating indication is present, a driver of the device selected on the check result window 2002 shown in FIG. 20 is updated, and a source of a user interface screen of a message window 2201 shown in FIG. 22 is produced and displayed on CRT 16 using function of OS (12). When updating processing is finished, all processing is finished.

The updating method of the driver of the device in Step (12) is carried out on the basis of device setting information acquired from the control server 103 or C for controlling the device for updating the driver. The driver setting information 42d of the device setting information shown in FIG. 5 is a DLL file required for installation of a driver, or a driver installer module in the form of execution, as mentioned above. Installing processing of a driver is carried out by executing the installer, or copying the DLL file in the system to update a registry, and the version of the driver is automatically updated. In the automatic updating processing, setting of IP address and port numbers set on the driver installed already is automatically done continuously.

The aforementioned FIG. 18 is a view for explaining one example of a message window 601 displayed on CRT 16 shown in FIG. 2. The message window 601 is displayed on CRT 16 when processing of (5) to (7) in the flow chart shown in FIG. 21 is executed.

In FIG. 19, numeral 1901a denotes an OK button, which is selected by a pointing device 13 to thereby to shift to next processing from the Step (9) in the flow chart shown in FIG. 21.

FIG. 20 is a view for explaining one example of a check result window 2001 displayed on CRT 16 shown in FIG. 2. The check result window 2001 is displayed on CRT 16 in Step (10) of the flow chart shown in FIG. 21, and is a window for displaying a list of devices of which drivers need to be updated as a result of comparison of version information.

In FIG. 20, numeral 2001 designates a check result window. Numeral 2002 designates a list window, which display in a list, appellations of devices of which drivers need be updated, driver names, and version numbers updated. An operator can select one or a plurality of devices displayed within the list window 2002 by operating a pointing device 13 or a keyboard 12.

Numeral 2003 designates an updating execution button. When the updating execution button 2003 is selected, updating processing of the driver of the device selected by the list window 2002 is executed. Numeral 2004 designates a cancel button. When the cancel button 2004 is selected, updating processing of the driver is stopped.

FIG. 22 is a view for explaining one example of a message window 2201 displayed on CRT 16 shown in FIG. 2. The message window 2201 is displayed on CRT 16 during updating of a driver in Step (12) in the flow chart shown in FIG. 21.

In FIG. 22, numeral 2201 designates a message window. Numeral 2201a designates an OK button. This OK button is selected to thereby shift to the next processing from Step (12) in the flow chart shown in FIG. 21.

As described above, the information processing apparatus shown in the present embodiment is provided with a communication controller 4 for receiving and transmitting information data between PCs connected to the network (LAN, WAN). CPU 2 reads information of PC on the network and connecting information of peripheral devices such as a printer and a scanner connected thereto in accordance with the processing procedure of the flow chart shown in FIG. 2 through the communication controller 4, reads status information of PCs and the peripheral devices connected on the basis of the read information, and stores the read information in PMEM 3.

The connecting setup and using circumstances of all PCs and peripheral devices connected on the network are displayed with the device display window 300 on CRT 16 on the basis of the read information, and CPU 2 acquires versions of drivers of peripheral devices installed on my machine, and acquires driver setting information and version information registered in the control server 103 for devices for checking version information selected on the device display window 300 by an operator or PC for controlling devices.

The acquired version information is compared, the compared result is displayed as the message window 801 and the check result window 901 on CRT 16, and the driver updating indicated by an operator in the check result window 901 for indicating devices of which drivers are updated is updated on the basis of driver setting information acquired from the control server.

Thus, version information of drivers of peripheral devices owned jointly on the network is checked, and if the driver need be updated, the driver can be updated in a simple operation, thus enabling improvement in work efficiency.

The above-described fourth data processing procedure has been explained of the case where version information of the driver installed on my machine is compared with version information of the driver stored in the control server, and if the driver need be updated, the driver is updated.

Since the fourth data processing procedure is constituted so that whether or not the driver of the device is updated within the application executed by PC is judged to update necessary driver, the driver is not updated unless an operator consciously indicates execution of the application.

In the present fifth data processing procedure, a description is made of the case where there are provided means for comparing, when a driver is updated by one of a plurality of PCs owning jointly devices on the network, driver setting information controlled by the control server 103 with the version of the driver installed, means for preparing driver setting information updated on the PC to register it in the control server 103, means for notifying other PC on the network that the driver of the device is updated, means for receiving a notice of updating of the driver from other PCs, means for judging whether or not the driver of the device notified is installed, and means for updating the driver in accordance with the notice of updating, whereby the drivers of the same version can be installed by all PCs on the network jointly owning the devices.

Also in the present data processing procedure, a description is made using as one example the information processing system shown in FIG. 1 in which a plurality of PCs provided with the control constitution shown in FIG. 2, a server and various devices are connected to the network.

In the following, a description is made, with reference to a flow chart of FIG. 23, a processing procedure of PC for updating a driver on the network and a processing procedure where a driver is updated in PC 111 shown in FIG. 1, for example.

Figure 23:
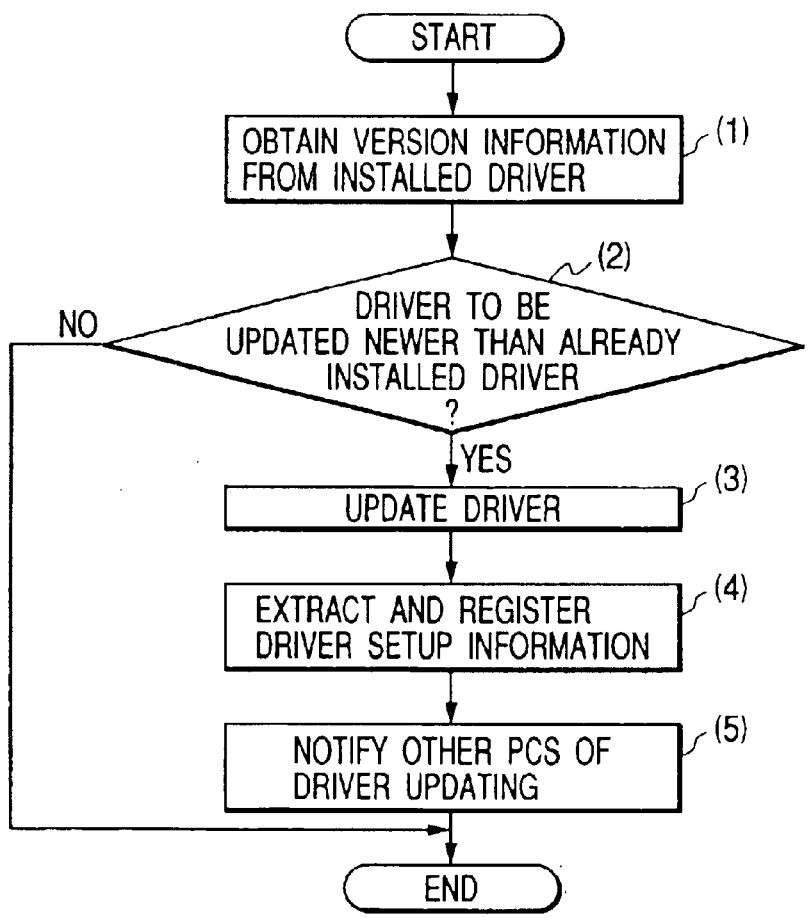
FIG. 23 is a flowchart showing one example of a fifth data processing procedure in the data processing apparatus according to the present invention.

FIG. 23 is a flow chart for explaining one example of the fifth data processing procedure in the information processing apparatus shown in the present embodiment, which is a processing executed by PC 111 shown in FIG. 1, corresponding to a processing executed by CPU 2 in accordance with a control program stored in a memory such as HD 10 shown in FIG. 2. (1) to (5) designate the Steps.

First, CPU 2 of my machine acquires version information from a driver installed for controlling a printer 18 and an image read device (scanner) connected in local to my machine (1), and checks (compares) whether or not which one of a driver to be updated or a driver installed already is new (2). Where the version of the driver to be updated is old as a result thereof, processing is finished, while where the version of the driver to be updated is new, updating processing of the driver takes place (3).

Next, CPU 2 of my machine extracts device setting information necessary for installing the drive of the updated device from a file of a driver installed, to deliver it to the control server 103 through the network and register it in the control server 103. Then, CPU 2 of my machine notifies other PCs 104, 112, 115, 121, and 122 on the network that the driver of the device was updated (5) to finish processing. This notice is accomplished such that the present application indicates IP addresses of other PCs on the network and indicates a port used in the present application. The port number is a number zone that can be freely used by OS, and for example, where ten thousands (10000) number is used freely, the port number is registered in advance in 10550 number as a port of, the present application in a registry of OS for use.

The notice of updating in Step (5) may be done by the control server 103 in which device setting information is registered. In that case, control is made as follows. In the control server 103, the device drivers installed on clients (PC 104, 112, 115, 121, and 122) on the network are controlled by a control table, and where device setting information is registered and updated from a certain client, the client having the driver of the device corresponding to the device setting information installed is retrieved from the control table, and a notice of updating of the driver may be sent to the client retrieved.

In the following, a processing procedure in PC which has received the notice of updating of the driver on the network, PC 112 as one example, will be described with reference to a flow chart of FIG. 24.

Figure 24:
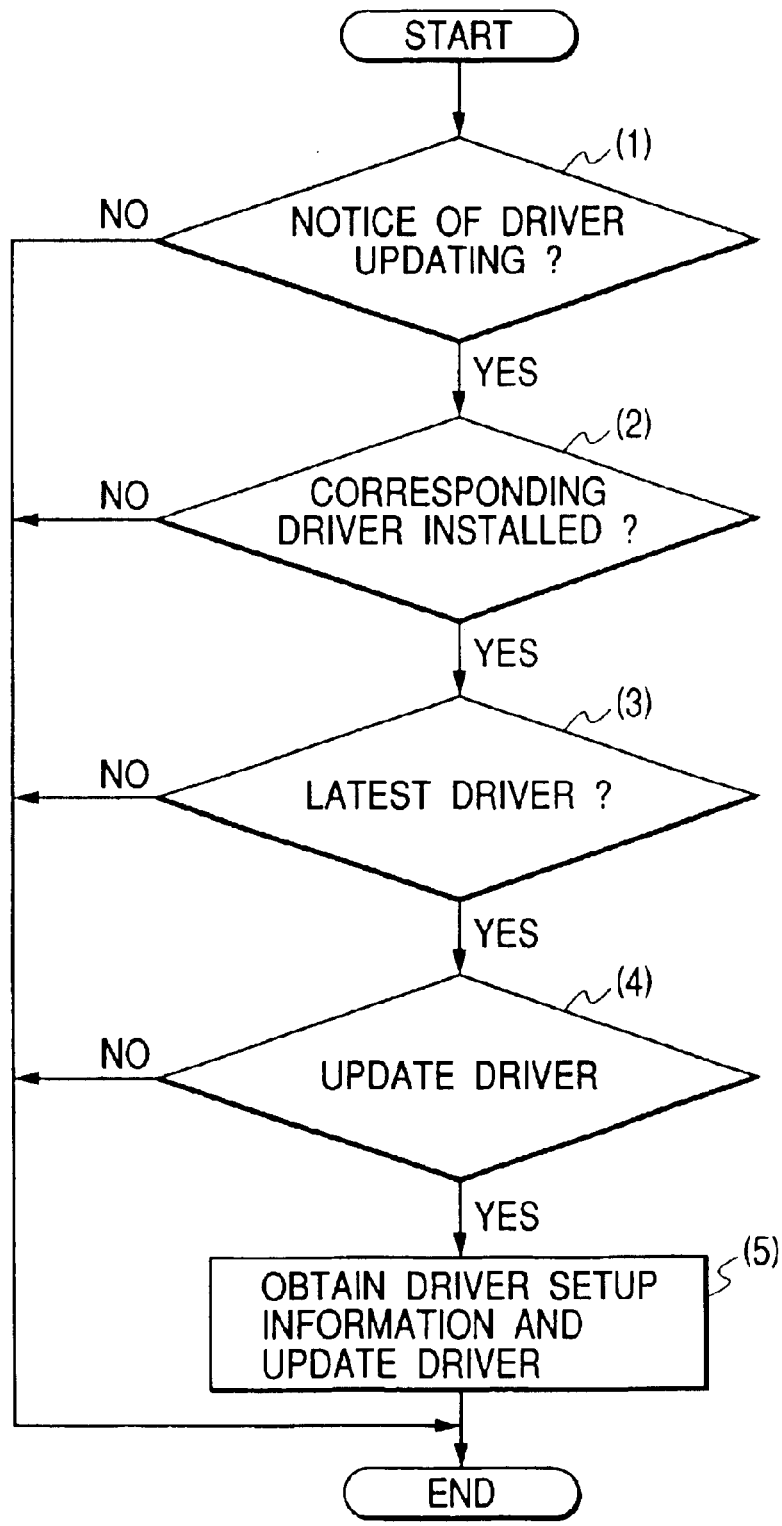
FIG. 24 is a flowchart showing one example of a sixth data processing procedure in the data processing apparatus according to the present invention.

FIG. 24 is a flow chart for explaining one example of a sixth data processing procedure in the information processing apparatus showing the present embodiment, which corresponds to the processing procedure executed by PC 112 shown in FIG. 1, corresponding to the processing executed by CPU 2 in accordance with the control program stored in a memory, such as HD 10 shown in FIG. 2. (1) to (5) designate the Steps.

First, CPU 2 of an information processing apparatus 112 checks whether or not a notice of updating a driver is made from other PCs 104, 111, 115, 121 and 122 through the network (1); where the updating notice is not present, processing is finished, while where the notice is present, judgment is made whether or not the driver for which updating notice is made is installed on PC 112 (2); and where judgment is made that the driver corresponding to the driver for which the updating notice is made is not installed on PC 112, processing is finished.

On the other hand, where in Step (2), the driver corresponding to the driver for which the updating notice is made is installed, CPU 2 of the information processing apparatus 112 compares version information of the driver for which the updating notice is made with version information of the driver installed already to judge whether or not the driver for which the updating notice is made is latest, that is, new as compared with the driver installed already (3), and where the driver for which the updating notice is made is old, processing is finished.

On the other hand, in Step (3) where the driver for which the updating notice is made is new, CPU 2 of the information processing apparatus 112 judges if the driver is updated (4). In this Step, a message is displayed in which whether or not updating is made is indicated by a user. If updating is not made, processing is finished.

On the other hand, if updating is made, CPU 2 of the information processing apparatus 112 updates the driver on the basis of driver setting information registered in the control server 103 (5, and processing is finished.

In Step (4), where a user has set such that updating of a driver is automatically carried out in advance, a message display is not made but the driver is automatically updated.

While in the processing shown in a flow chart of FIG. 24, a description has been made of the case where when receiving an updating notice form other PCs, processes after Step (2) are executed, it is noted that where indication of execution of either device is made in my machine, it is installed on my machine. Alternatively, where version information of a driver of either device indicated in execution is compared with version information of a driver of either device registered in the control server 103, and version information of a driver of either device indicated in execution is older than version information of a driver of either device registered in the control server 103, processing after Step (4) in FIG. 24 may take place.

Figure 25:
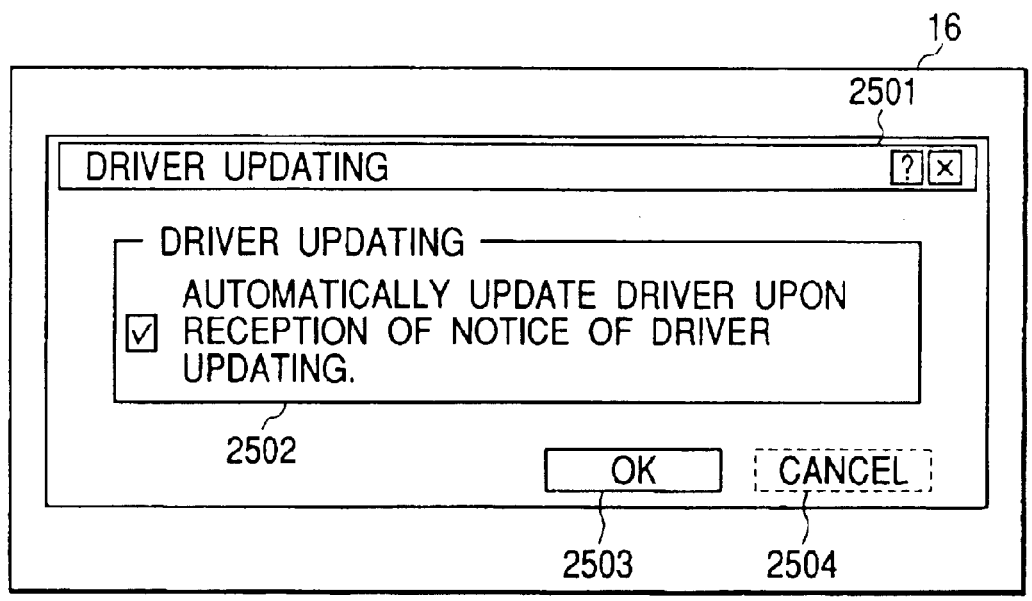
FIG. 25 is a view for explaining one example of a driver updating setup window displayed on CRT shown in FIG. 2.

FIG. 25 is a view for explaining one example of a driver updating setup window 1201 displayed on CPU 16 shown in FIG. 2.

In FIG. 25, numeral 1201 designates a driver updating setup window. Numeral 1201 designates a check box, which decides whether or not updating is automatically made. Numeral 1203 designates an execution button, and 1204 designates a cancel button.

According to the above-described embodiments, in the window on which are displayed PCs owned jointly on the network and peripheral devices, the version check of drivers of devices can be carried out by a simple operation, and with respect to the device that need be updated, updating processing can be executed easily whereby drivers can be always placed latest, and the work efficiency can be particularly improved.

In the following, the constitution of data processing programs capable of being read by the information processing apparatus and information processing system according to the present invention will be described with reference to a memory map shown in FIG. 26.

FIG. 26 is a view for explaining one example of a memory map of a storage medium for storing various data processing programs capable of being read by the information processing apparatus and information processing system according to the present invention.

Although not particularly shown, information for controlling a group of programs stored in a storage medium, for example, version information, a preparing person being also stored, and information depending on OS or the like on the read side of programs, for example, icons for discriminating and displaying programs are sometimes stored.

Further, data depending on various programs are also controlled by the directory. Further, where programs for installing various programs in a computer, and programs for installation are compressed, decompressing programs are also sometimes stored.

The functions shown in FIGS. 10, 12, 17, 21, 24 and 25 in the present embodiments may be executed by a host computer in accordance with the first to sixth data processing programs installed externally. In that case, even where a group of information including programs is supplied to an output device by CD-ROM and a storage medium such as a flash memory or FD, or from an external storage medium through the network, the present invention is applied.

As described above, needless to say, the object of the present invention is achieved even by configuration that a storage medium having a program code of a soft ware for realizing the function of the aforementioned embodiments recorded is supplied to the system or apparatus, and a computer (or CPU or MPU) of the system or apparatus reads and executes the program code stored in the storage medium.

In this case, the program code itself read from the storage medium is to realize a novel function of the present invention, and the storage medium having the program code stored is to constitute the present invention.

The storage media for supplying a program code that can be used include, for example, a floppy disk, a hard disk, an optical disk, an optical magnetic disk, CD-ROM, CD-R, a magnetic tape, a non-volatile memory card, ROM, EEPROM, etc.

Further, needless to say, a program code read by a computer is executed whereby not only the function of the aforementioned embodiments is realized, but OS (Operating System) or the like operated on the computer in accordance with the indication of the program code performs a part of or the whole actual processing, by which processing the function of the aforementioned embodiments is realized.

Further, needless to say, a program code read from the storage medium is written into a memory provided in a function expansion board inserted into a computer or a function expansion unit connected to a computer, and after this, the CPU or the like provided in a function, expansion board or a function expansion unit performs a part of or the whole actual processing, by which processing the function of the aforementioned embodiments is realized.

Further, in order that the function processing of the present invention is realized by a computer, the program code itself installed in the computer is to realize the present invention. That is, the computer program itself for realizing the function processing of the present invention is also included in claims of the present invention.

As the supplying method for a computer program, the program can be supplied, as mentioned above, by storing it in FD or CD-ROM, having a computer read it and installing it in the computer, and in addition, the program can be supplied by connecting it to a home page on the internet using a plausa of a client computer, and down-loading the computer program itself of the present invention, or a file compressed and including an automatic installing function from the home page. This can be also realized by dividing a program code constituting a program of the present invention into a plurality of files, and down-loading the respective files from different home pages. That is, the WWW server for down-loading a program file for realizing the function processing of the present invention by a computer relative to a plurality of users is also included in claims of the present invention.

Further, that can be realized by coding a program to store it in a storage medium such as FD and distribute it to a user, down-loading key information for decoding a code from a home page through an internet relative to a user having fixed conditions cleared, and using the key information to thereby execute the coded program to install it in a computer.

As many apparently widely different embodiments of the present invention can be made without departing from the spirit and scope hereof, it is to be understood that the invention is not limited to the specific embodiments thereof as defined in the appended claims.

As explained above, according to the present invention, checking whether or not drivers of devices are new can be accomplished in a simple operation on the PC on the network and the window on which devices are displayed, and driver setting information stored in the server are acquired to update the drivers, whereby the work efficiency of updating drivers can be particularly enhanced.

What is claimed is:

1. An information processing apparatus for communicating with an external device through a network, comprising:
acquiring means for acquiring device information of a peripheral device shared on said network from said external device;
system display controlling means for displaying, on a display section, a system condition of said peripheral device shared on said network together with an icon by a user interface on a basis of said device information acquired from said external device by said acquiring means;
instructing means for instructing installation of a driver for said peripheral device shared on said network in said user interface having said system condition displayed by said system display controlling means; and
installation controlling means for acquiring driver setting information instructed to be installed by said instructing means from said external device to execute automatic installation processing of said driver.

2. The information processing apparatus according to claim 1, wherein said instructing means can instruct the installation of drivers for a plurality of peripheral devices shared on said network by one operation instruction in said user interface having said system condition displayed by said system display controlling means.

3. The information processing apparatus according to claim 2, wherein said instructing means instructs the installation of said drivers for said plurality of peripheral devices under control of a server icon, when an installation instruction is issued selecting said server icon in said user interface having said system condition displayed by said system display controlling means.

4. The information processing apparatus according to claim 3, wherein said instructing means instructs the installation of a driver for a selected peripheral device when an installation instruction is issued selecting a peripheral device icon and displaying said system condition by said system display controlling means.

5. The information processing apparatus according to claim 1, further comprising installation shifting means for shifting to an installation function provided by an operating system when said driver instructed to be installed by said instructing means cannot be acquired from said external device.

6. The information processing apparatus according to claim 1, further comprising registering means for extracting setting information of said driver which is to be installed by said installation controlling means and for registering the extracted setting information in an external device which is a management server through said network.

7. The information processing apparatus according to claim 6, further comprising driver information display controlling means for acquiring said registered setting information of said driver from said management server and for displaying the acquired registered setting information on said display section, in executing said installation processing of said driver by said installation controlling means.

8. An information processing method for communicating with an external device through a network, comprising:
   acquiring step for acquiring device information of a peripheral device shared on said network from said external device;
   system display controlling step for displaying, on a display section, a system condition of said peripheral device shared on said network, together with an icon, by a user interface on a basis of said device information acquired from said external device by said acquiring step;
   instructing step for instructing installation of a driver for said peripheral device shared on said network in said user interface having said system condition displayed by said system display controlling step; and
   installation controlling step for acquiring driver setting information instructed to be installed by said instructing step from said external device to execute automatic installation processing of said driver.

9. The information processing method according to claim 8, wherein said instructing step can instruct the installation of drivers for a plurality of peripheral devices shared on said network by one operation instruction in said user interface having said system condition displayed by said system display controlling step.

10. The information processing method according to claim 9, wherein said instructing step instructs the installation of said drivers for said plurality of peripheral devices under control of a server icon when an installation instruction is issued selecting said server icon in said user interface having said system condition displayed by said system display controlling step.

11. The information processing method according to claim 10, wherein said instructing step instructs the installation of a driver for a selected peripheral device when an installation instruction is issued selecting a peripheral device icon and displaying said system condition by said system display controlling step.

12. The information processing method according to claim 8, further comprising an installation shifting step for shifting to an installation function provided by an operating system when said driver instructed to be installed by said instructing step cannot be acquired from said external device.

13. The information processing method according to claim 8, further comprising a registering step for extracting setting information of said driver which is to be installed by said installation controlling step and for registering the extracted setting information in an external device, which is a management server, through said network.

14. The information processing method according to claim 13, further comprising a driver information display controlling step for acquiring said registered setting information of said driver from said management server and for displaying the acquired setting information on said display section, in executing said installation processing of said driver by said installation controlling step.

15. A computer-readable memory medium which stores a program for communicating with an external device through a network, said program comprising:
   acquiring step for acquiring device information of a peripheral device shared on said network from said external device;
   system display controlling step for displaying, on a display section, a system condition of said peripheral device shared on said network, together with an icon, by a user interface on a basis of said device information acquired from said external device by said acquiring step;
   instructing step for instructing installation of a driver for said peripheral device shared on said network in said user interface having said system condition displayed by said system display controlling step; and
   installation controlling step for acquiring driver setting information instructed to be installed by said instructing step from said external device to execute automatic installation processing of said driver.

16. The computer-readable memory medium according to claim 15, wherein said instructing step can instruct the installation of drivers for a plurality of peripheral devices shared on said network by one operation instruction in said user interface having said system condition displayed by said system display controlling step.

17. The computer-readable memory medium according to claim 16, wherein said instructing step instructs the installation of said drivers for said plurality of peripheral devices under control of a server icon when an installation instruction is issued selecting said server icon in said user interface having said system condition displayed by said system display controlling step.

18. The computer-readable memory medium according to claim 17, wherein said instructing step instructs the installation of a driver for a selected peripheral device when an installation instruction is issued selecting a peripheral device icon and displaying said system condition by said system display controlling step.

19. The computer-readable memory medium according to claim 15, further comprising installation shifting step for shifting to an installation function provided by an operating system when said driver instructed to be installed by said instructing step cannot be acquired from said external device.

20. The computer-readable memory medium according to claim 15, further comprising a registering step for extracting setting information of said driver which is to be installed by said installation controlling step and for registering the extracted setting information in an external device, which is a management server, through said network.

21. The computer-readable memory medium according to claim 20, further comprising a driver information display controlling step for acquiring said registered setting information of said driver from said management server and for displaying the acquired setting information on said display section, in executing said installation processing of said driver by said installation controlling step.

22. A program which, when implemented by a computer, causes the computer to perform a method for communicating with an external device through a network, comprising:

acquiring step for acquiring device information of a peripheral device shared on said network from said external device;

system display controlling step for displaying, on a display section, a system condition of said peripheral device shared on said network, together with an icon, by a user interface on a basis of said device information acquired from said external device by said acquiring step;

instructing step for instructing installation of a driver for said peripheral device shared on said network in said user interface having said system condition displayed by said system display controlling step; and installation controlling step for acquiring driver setting information instructed to be installed by said instructing step from said external device to execute automatic installation processing of said driver.

23. The program according to claim 22, wherein said instructing step can instruct the installation of drivers for a plurality of peripheral devices shared on said network by one operation instruction in said user interface having said system condition displayed by said system display controlling step.

24. The program according to claim 23, wherein said instructing step instructs the installation of said drivers for said plurality of peripheral devices under control of a server icon when an installation instruction is issued selecting said server icon in said user interface having said system condition displayed by said system display controlling step.

25. The program according to claim 24, wherein said instructing step instructs the installation of a driver for a selected peripheral device when an installation instruction is issued selecting a peripheral device icon and displaying said system condition by said system display controlling step.

26. The program according to claim 22, further comprising an installation shifting step for shifting to an installation function provided by an operating system when said driver instructed to be installed by said instructing step cannot be acquired from said external device.

27. The program according to claim 22, further comprising a registering step for extracting setting information of said driver which is to be installed by said installation controlling step and for registering the extracted setting information in an external device which is a management server through said network.

28. The program according to claim 27, further comprising a driver information display controlling step for acquiring said registered setting information of said driver from said management server and for displaying the acquired setting information on said display section, in executing said install processing of said driver by said install controlling step.

29. An information processing apparatus for communicating with an external device through a network, comprising:

device information acquiring means for acquiring device information of a peripheral device shared on said network from said external device;

system display controlling means for displaying, on a display section, an overall system condition of said peripheral device shared on said network, and a system condition of a user network of a peripheral device arbitrarily selected from said overall system condition, together with icons, by a user interface in such a manner that the overall system condition and the system condition of the user network can be identified, on a basis of said device information acquired from said external device by said device information acquiring means;

instructing means for instructing to register said peripheral device in said user network; and installation controlling means for executing installation processing of a driver for said peripheral device when registering of said peripheral device to said user network is newly instructed by said instructing means, wherein said system display controlling means dividedly displays a system window for displaying said overall system condition, and a peripheral window for displaying said system condition of a desired peripheral device designated by a user.

30. The information processing apparatus according to claim 29, wherein said peripheral window has icons of peripheral devices arranged around an icon of said information processing apparatus.

31. The information processing apparatus according to claim 29, wherein said instructing means instructs to register said peripheral device in said user network by effecting movement of an icon of said peripheral device between said system window and said peripheral window which are dividedly displayed by said system displaying means.

32. The information processing apparatus according to claim 31, further comprising judging means for judging whether driver setting information for a driver of said icon has already been registered in said information processing apparatus during the movement of said peripheral device icon by said instructing means, wherein said installation controlling means acquires said driver setting information to be installed from said external device to execute the installation processing of said driver when said judging means determines that said driver setting information has not been registered.

33. The information processing apparatus according to claim 32, wherein said installation controlling means uses said registered driver setting information to execute said installation processing of said driver when said judging means determines that said driver setting information has already been registered.

34. The information processing apparatus according to claim 31, wherein said instructing means can instruct, by drag and drop, the movement of said icon between said system window and said peripheral window which are dividedly displayed.

35. The information processing apparatus according to claim 29, wherein said system displaying means identifies a display mode of an icon of an installed device between said system window and said peripheral window which are separately displayed after completion of installation by said installation controlling means, and displays the identified display mode.

36. The information processing apparatus according to claim 29, further comprising writing means for writing positional information of an icon displayed in said peripheral favorite window into a storing means, wherein said system displaying means arranging and displaying said icon on a basis of said positional information stored in said storing means.

37. An information processing method of an information processing apparatus for communicating with an external device through a network, comprising the steps of:

device information acquiring step for acquiring device information of a peripheral device shared on said network from said external device;

system display controlling step for displaying, on a display section, an overall system condition of said peripheral device shared on said network, and a system condition of a user network of a peripheral device arbitrarily selected from said overall system condition, together with icons, by a user interface in such a manner that the overall system condition and the system condition of the user network can be identified, on a basis of said device information acquired from said external device by said device information acquiring step;

instructing step for instructing to register said peripheral device in said user network; and installation controlling step for executing installation processing of a driver for said peripheral device when registration of said peripheral device to said user network is newly instructed by said instructing step, wherein said system controlling step dividedly displays a system window for displaying said overall system condition and a peripheral window for displaying said system condition of a desired peripheral device designated by a user.

38. The information processing method according to claim 37, wherein said peripheral window has icons of peripheral devices arranged around an icon of said information processing apparatus.

39. The information processing method according to claim 37, wherein said instructing step instructs registration of said peripheral device by effecting movement of an icon between said system window and said peripheral window which are dividedly displayed by said system displaying step.

40. The information processing method according to claim 39, further comprising a judging step for judging whether driver setting information for a driver of said icon has already been registered in said information processing apparatus during the movement of said icon by said instructing step, wherein said installation controlling step acquires said driver setting information to be installed from said external device to execute the installation processing of said driver when said judging step determines that said driver setting information has not been registered.

41. The information processing method according to claim 40, wherein said installation controlling step uses said registered driver setting information to execute said installation processing of said driver when said judging step determines that said driver setting information has already been registered.

42. The information processing method according to claim 39, wherein said instructing step can instruct, by drag and drop, the movement of said icon between said system window and said peripheral window which are dividedly displayed.

43. The information processing method according to claim 37, wherein said system displaying step identifies a display mode of an icon of an installed device between said system window and said peripheral window which are separately displayed after completion of installation by said installation controlling step, and displays the identified display mode.

44. The information processing method according to claim 37, further comprising a writing step for writing positional information of an icon displayed in said peripheral window into a storing means, wherein said system displaying step comprises arranging and displaying said icon on a basis of said positional information stored in said storing step.

45. A computer-readable memory medium which stores a program of an information processing apparatus for communicating with an external device through a network, said program comprising:

device information acquiring step for acquiring device information of a peripheral device shared on said network from said external device;

system display controlling step for displaying, on a display section, an overall system condition of said peripheral device shared on said network, and a system condition of a user network of a peripheral device arbitrarily selected from said overall system condition, together with icons, by a user interface in such a manner that the overall system condition and the system condition of the user network can be identified, on a basis of said device information acquired from said external device by said device information acquiring step;

instructing step for instructing to register said peripheral device in said user network; and installation controlling step for executing installation processing of a driver for said peripheral device when registration of said peripheral device to said user network is newly instructed by said instructing step, wherein said system controlling step dividedly displays a system window for displaying said overall system condition and a peripheral window for displaying said system condition of a desired peripheral device designated by a user.

46. The computer-readable memory medium according to claim 45, wherein said peripheral window has icons of peripheral devices arranged around an icon of said information processing apparatus.

47. The computer-readable memory medium according to claim 45, wherein said instructing step instructs registration of said peripheral device by effecting movement of said icon between said system window and said peripheral window which are dividedly displayed by said system displaying step.

48. The computer-readable memory medium according to claim 47, further comprising a judging step for judging whether driver setting information for a driver of said icon has already been registered in said information processing apparatus during the movement of said icon by said instructing step, wherein said installation controlling step acquires said driver setting information to be installed from said external device to execute installation processing of said driver when said judging step determines that said driver setting information has not been registered.

49. The computer-readable memory medium according to claim 48, wherein said installation controlling step uses said registered driver setting information to execute said installation processing of said driver when said judging step determines that said driver setting information has already been registered.

50. The computer-readable memory medium according to claim 47, wherein said instructing step can instruct, by drag and drop, the movement of said icon between said system window and said peripheral window which are dividedly displayed.

51. The computer-readable memory medium according to claim 45, wherein said system displaying step identifies a display mode of an icon of an installed device between said system window and said peripheral window which are separately displayed after completion of install by said installation controlling step, and displays the identified display mode.

52. The computer-readable memory medium according to claim 45, further comprising a writing step for writing positional information of an icon displayed in said peripheral window into a storing means, wherein
said system displaying step comprises arranging and displaying said icon on a basis of said positional information stored in said storing means.

53. A program which, when implemented by a computer causes the computer to perform a method for communicating with an external device through a network, said program comprising:
device information acquiring step for acquiring device information of a peripheral device shared on said network from said external device;
system display controlling step for displaying, on a display section, an overall system condition of said peripheral device shared on said network, and a system condition of a user network of a peripheral device arbitrarily selected from said overall system condition, together with icons, by a user interface in such a manner that the overall system condition and the system condition of the user network can be identified, on a basis of said device information acquired from said external device by said device information acquiring step;
instructing step for instructing to register said peripheral device in said user network; and
installation controlling step for executing installation processing of a driver for said peripheral device when registration of said peripheral device to said user network is newly instructed by said instructing step,
wherein said system controlling step dividedly displays a system window for displaying said overall system condition and a peripheral window for displaying said system condition of a desired peripheral device designated by a user.

54. The program according to claim 53, wherein said peripheral has icons of peripheral devices arranged around an icon of said information processing apparatus.

55. The program according to claim 53, wherein said instructing step instructs registration of said peripheral device by effecting movement of said icon between said system window and said peripheral window which are dividedly displayed by said system displaying step.

56. The program according to claim 55, further comprising a judging step for judging whether driver setting information for a driver of said icon has already been registered in said information processing apparatus during the movement of said icon by said instructing step, wherein
said installation controlling step acquires said driver setting information to be installed from said external device to execute the installation processing of said driver when said judging step determines that said driver setting information has not been registered.

57. The program according to claim 56, wherein said installation controlling step uses said registered driver setting information to execute said installation processing of said driver when said judging step determines that said driver setting information has already been registered.

58. The program according to claim 55, wherein said instructing step can instruct, by drag and drop, the movement of said icon between said system window and said peripheral window which are dividedly displayed.

59. The program according to claim 53, wherein said system displaying step identifies a display mode of an icon of an installed device between said system window and said peripheral window which are separately displayed after completion of installation by said installation controlling step, and displays the identified display mode.

60. The program according to claim 53, further comprising a writing step for writing positional information of an icon displayed in said peripheral window into a storing means, wherein
said system displaying step comprises arranging and displaying said icon on a basis of said positional information stored in said storing means.

61. An information processing apparatus for communicating with an external device through a network, comprising:
an acquiring unit that acquires device information of a peripheral device shared on said network from said external device;
a system display controller that displays, on a display section, a system condition of said peripheral device shared on said network together with an icon by a user interface on a basis of said device information acquired from said external device by said acquiring unit;
an instructing unit instructs installation of a driver for said peripheral device shared on said network in said user interface having said system condition displayed by said system display controller; and
an installation controller that acquires driver setting information instructed to be installed by said instructing unit from said external device to execute automatic installation processing of said driver.

62. An information processing apparatus for communicating with an external device through a network, comprising:
a device information acquiring unit that acquires device information of a peripheral device shared on said network from said external device;
a system display controller that displays, on a display section, an overall system condition of said peripheral device shared on said network, and a system condition of a user network of a peripheral device arbitrarily selected from said overall system condition, together with icons, by a user interface in such a manner that the overall system condition and the system condition of the user network can be identified, on a basis of said device information acquired from said external device by said device information acquiring unit;
an instructing unit that instructs to register said peripheral device in said user network; and
an installation controller that executes installation processing of a driver for said peripheral device when registering of said peripheral device to said user network is newly instructed by said instructing unit,
wherein said system display controller dividedly displays a system window for displaying said overall system condition, and a peripheral window for displaying said system condition of a desired peripheral device designated by a user.

63. An information processing method for communicating with an external device through a network, comprising:

an acquiring of acquiring device information of a peripheral device shared on said network from said external device;

a system display controlling step of displaying, on a display section, a system condition of said peripheral device shared on said network, together with an icon, by a user interface on a basis of said device information acquired from said external device by said acquiring step;

an instructing step of instructing installation of a driver for said peripheral device shared on said network in said user interface having said system condition displayed by said system display controlling step; and an installation controlling step of acquiring driver setting information instructed to be installed by said instructing step from said external device to execute automatic installation processing of said driver.

64. An information processing method of an information processing apparatus for communicating with an external device through a network, comprising the steps of:

a device information acquiring step of acquiring device information of a peripheral device shared on said network from said external device;

a system display controlling step of displaying, on a display section, an overall system condition of said peripheral device shared on said network, and a system condition of a user network of a peripheral device arbitrarily selected from said overall system condition, together with icons, by a user interface in such a manner that the overall system condition and the system condition of the user network can be identified, on a basis of said device information acquired from said external device by said device information acquiring step;

an instructing step of instructing to register said peripheral device in said user network; and an installation controlling step of executing installation processing of a driver for said peripheral device when registration of said peripheral device to said user network is newly instructed by said instructing step, wherein said system controlling step dividedly displays a system window for displaying said overall system condition and a peripheral window for displaying said system condition of a desired peripheral device designated by a user.

* * * * *

UNITED STATES PATENT AND TRADEMARK OFFICE
CERTIFICATE OF CORRECTION

PATENT NO. : 6,915,514 B1
APPLICATION NO. : 09/544265
DATED : July 5, 2005
INVENTOR(S) : Haruo Machida It is certified that error appears in the above-identified patent and that said Letters Patent is hereby corrected as shown below:

IN THE DRAWINGS

Sheet 8, Fig. 10, "PCS" should read --PCs-- (2 occurrences).
Sheet 9, Fig. 11, "PCS" should read --PCs-- (2 occurrences).
Sheet 13, Fig. 17, "PCS" should read --PCs-- (2 occurrences).
Sheet 15, Fig. 21, "PCS" should read --PCs-- (2 occurrences) and "DEVICE ?" should read --DEVICES ?--.
Sheet 16, Fig. 23, "PCS" should read --PCs-- (1 occurrence).

COLUMN 5
Line 53, "provide" should read --provides--.

COLUMN 7
Line 1, "controller IA" should read --controller 1A--; and
Line 35, "editing 303b;" should read --editing 303b,--.

COLUMN 8
Line 12, "a" should read --an--;
Line 15, "PCS" should read --PCs--; and
Line 19, "an" should read --and--.

COLUMN 9
Line 1, "down loaded" should read --downloaded--.

COLUMN 12
Line 37, "PCS" should read --PCs--.

COLUMN 13
Line 37, "hot" should read --not--.

COLUMN 14
Line 28, "favorite" should read --favorites-- and "'Open'" should read (New Paragraph) --"Open"--.

COLUMN 15
Line 13, "3303I and 3303I" should read --3303i and 3303ℓ--.

COLUMN 16
Line 16, "these" should read --this--; and
Line 27, "CPU,2" should read --CPU 2--.

UNITED STATES PATENT AND TRADEMARK OFFICE
CERTIFICATE OF CORRECTION

PATENT NO. : 6,915,514 B1
APPLICATION NO. : 09/544265
DATED : July 5, 2005
INVENTOR(S) : Haruo Machida It is certified that error appears in the above-identified patent and that said Letters Patent is hereby corrected as shown below:

COLUMN 17
Line 42, "above-descried" should read --above-described--.

COLUMN 18
Line 11, "mation" should read --mation.--; and
Line 24, "a" should read --an--.

COLUMN 22
Line 27, "103 (5," should read --103 (5),--;
Line 33, "form" should read --from--; and
Lines 58-59, "be always placed latest," should read --always be the latest version,--.

COLUMN 23
Line 25, "soft ware" should read --software--; and
Line 65, "installing" should read --install--.

COLUMN 24
Line 1, "plausa" should read --browser--.

COLUMN 28
Line 61, "favorite" should be deleted.

COLUMN 31
Line 45, "peripheral" should read --peripheral window--.

Signed and Sealed this

Nineteenth Day of December, 2006

JON W. DUDAS
*Director of the United States Patent and Trademark Office*